(12) United States Patent
Wu et al.

(10) Patent No.: US 10,880,202 B2
(45) Date of Patent: Dec. 29, 2020

(54) JOINT FOUNTAIN CODING AND NETWORK CODING FOR LOSS-TOLERANT INFORMATION SPREADING

(71) Applicant: University of Florida Research Foundation, Incorporated, Gainesville, FL (US)

(72) Inventors: Dapeng Oliver Wu, Gainesville, FL (US); Kairan Sun, Gainesville, FL (US); Qiuyuan Huang, Gainesville, FL (US); Huazi Zhang, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 0 days.

(21) Appl. No.: 16/061,337

(22) PCT Filed: Dec. 21, 2016

(86) PCT No.: PCT/US2016/067968
§ 371 (c)(1),
(2) Date: Jun. 11, 2018

(87) PCT Pub. No.: WO2017/112744
PCT Pub. Date: Jun. 29, 2017

(65) Prior Publication Data
US 2019/0044844 A1    Feb. 7, 2019

Related U.S. Application Data

(60) Provisional application No. 62/270,568, filed on Dec. 21, 2015.

(51) Int. Cl.
*H04L 12/721* (2013.01)
*H04L 12/841* (2013.01)
(Continued)

(52) U.S. Cl.
CPC .......... *H04L 45/123* (2013.01); *H04L 1/0076* (2013.01); *H04L 47/283* (2013.01);
(Continued)

(58) Field of Classification Search
CPC ..... H04L 45/123; H04L 47/30; H04L 1/0076; H04L 47/283; H04L 2001/0097; H04L 47/24
See application file for complete search history.

(56) References Cited

U.S. PATENT DOCUMENTS 6,453,351 B1 * 9/2002 Endo .................. H04L 41/5054
370/232
8,837,605 B2 * 9/2014 Heng ...................... H04N 19/40
375/240.29
(Continued)

FOREIGN PATENT DOCUMENTS

KR    2011/0077648 A    7/2011
WO    WO 2017/112744 A1    6/2017

OTHER PUBLICATIONS

Huang et al., "Just FUN: A Joint Fountain Coding and Network Coding Approach to Loss-Tolerant Information Spreading," ACM International Symposium on Mobile Ad Hoc Networking and Computing (MobiHoc), 10 pages, (2014).
(Continued)

*Primary Examiner* — Andrew Lai
*Assistant Examiner* — Harry H Kim
(74) *Attorney, Agent, or Firm* — Alston & Bird LLP

(57) ABSTRACT

A network system for increasing data throughput and decreasing transmission delay along a data link from a source node to a sink node via a relay node is provided. The network system may include a first node configured to encode a second multitude of data packets based on an estimated rank distribution expressing a quality of the data
(Continued)

link and transmit the encoded second multitude of data packets. The network system may also include at least a second node configured to estimate the rank distribution based on a first multitude of data packets received from the first node prior to receiving at least one of the encoded second multitude of data packets, transmit the estimated rank distribution to the first node, and regenerate the second multitude of data packets if receiving a sufficient quantity of the encoded second multitude of data packets.

16 Claims, 19 Drawing Sheets

(51) Int. Cl.
*H04L 1/00* (2006.01)
*H04L 12/835* (2013.01)
*H04L 12/851* (2013.01)

(52) U.S. Cl.
CPC .............. *H04L 47/30* (2013.01); *H04L 47/24* (2013.01); *H04L 2001/0097* (2013.01)

(56) References Cited

U.S. PATENT DOCUMENTS

| | | | |
|---|---|---|---|
| 2004/0203383 A1* | 10/2004 | Kelton | H04L 1/02 455/41.2 |
| 2012/0188934 A1 | 7/2012 | Liu et al. | |
| 2013/0259041 A1* | 10/2013 | Lucani | H04N 21/437 370/390 |
| 2015/0161394 A1* | 6/2015 | Ferragut | H04L 63/1425 726/25 |
| 2015/0236819 A1* | 8/2015 | Zhovnirnovsky | H04L 1/1819 370/216 |
| 2015/0358121 A1* | 12/2015 | Sun | H04L 1/0693 370/336 |
| 2017/0338878 A1* | 11/2017 | Gao | H04W 72/082 |
| 2017/0373744 A1* | 12/2017 | Froberg Olsson | H04W 72/1231 |
| 2018/0309688 A1* | 10/2018 | Sarker | H04W 28/02 |

OTHER PUBLICATIONS

WIPO Application No. PCT/US2016/067968, PCT International Preliminary Report on Patentability dated Jun. 26, 2018.
WIPO Application No. PCT/US2016/067968, PCT International Search Report and Written Opinion of the International Searching Authority dated Mar. 22, 2017.

* cited by examiner

FIG. 12A

| FUN HEADER 1 | FUN HEADER 2 | PAYLOAD |

FIG. 12B

| 0 | 31 | 63 |
|---|---|---|
| SOURCE IP ADDRESS | | DESTINATION IP ADDRESS |
| PACKET SIZE | | NEXT HOP IP ADDRESS |
| GLOBAL ENCODING VECTOR | | |
| LOCAL ENCODING VECTOR | | |
| BATCH ID | NC SWITCH | BATCH SIZE | PACKET ID |

FIG. 12C

| 0 | 31 | 63 |
|---|---|---|
| SOURCE IP ADDRESS | | DESTINATION IP ADDRESS |
| PACKET SIZE | | NEXT HOP IP ADDRESS |
| GLOBAL ENCODING VECTOR | | |
| BATCH ID | NC SWITCH | BATCH SIZE | PACKET ID |

…

JOINT FOUNTAIN CODING AND NETWORK CODING FOR LOSS-TOLERANT INFORMATION SPREADING

CROSS REFERENCE TO RELATED APPLICATIONS

This application is a 371 National Stage Application of PCT/US2016/067968, filed Dec. 21, 2016, which claims the benefit under 35 § U.S.C 119(e) of U.S. Provisional Patent Application No. 62/270,568, filed Dec. 21, 2015, the contents of all of which are incorporated herein by reference in their entirety.

BACKGROUND

Information spreading is playing an increasingly important role in the big data era. Many applications, e.g., file distribution over the Internet and distributed computing in mobile ad-hoc networks (MANET), naturally require efficient and reliable information spreading in large-scale networks. However, the lossy nature of communication channels is the main factor that limits the performance of multi-hop information spreading. In particular, packet loss can be caused by uncorrectable bit errors in the physical (PHY) layer, congestion and buffer overflow in the medium access control (MAC) layer, and re-routing in the network layer. As the number of hops in a network increases, the throughput degradation caused by packet loss becomes more serious.

Uncorrectable bit errors may be caused by fading, shadowing, interference, path loss, noise, etc. [26]. At the transmitter, most physical layer schemes encode messages by both an error-detecting code such as cyclic redundancy check (CRC) and an error-correction code. At the receiver, a received packet is first decoded by the error-correction decoder. If the resulting packet has uncorrectable bit errors, it will not pass the check of the error-detecting module. Most physical layer designs will drop those packets that have uncorrectable bit errors.

To address the packet loss problem, various forward error correction (FEC) approaches have been proposed, such as fountain codes [2] and network coding [3]-[6]. Fountain codes (e.g., LT codes, Raptor codes [7]) is a class of capacity-approaching codes with low encoding/decoding complexity. However, fountain codes are not necessarily optimal due to the accumulated packet losses over multiple hops. Take an L-hop network with per-hop packet loss ratio $\epsilon$ for example, the end-to-end throughput is upper bounded by $(1-\epsilon)^L$, which may drop to zero as the number of hops $L \to \infty$. Network coding [3]-[6] overcomes the aforementioned drawback through introducing redundancy at relay nodes. Specifically, a relay node performs random linear network coding (RLNC) by combining and recoding the packets it has received. RLNC can achieve an end-to-end throughput of $1-\epsilon$ for the same L-hop lossy network [8].

In spite of the throughput gain, RLNC suffers from high computational complexity and excessive coefficient overhead [9]. To reduce complexity, the packets of a file is partitioned into non-overlapping or overlapping subsets (or segments [10], generations [11], [12], blocks [13], batches [14], trunks [15]-[17]), and coding is restricted within each subset. Alternatively, a cross-next-hop network coding architecture called COPE [18] was proposed to recover the combined packets at next-hop relay nodes, but not end nodes, which also leads to significant complexity reduction.

Recently, several joint fountain coding and network coding schemes have been proposed to strike a good balance between throughput and complexity. In this sense, both fixed [19] and tunable sparsity levels [20], [21] yield satisfying results. Meanwhile, several approaches [1], [8], [22]-[24] employed two-layered joint coding to achieve the same goal. Specifically, the source node uses erasure codes as the outer codes to encode the native packets, and each relay node further recodes these coded packets using intra-session network coding (where coding is restricted to one network flow) as the inner code. In [22]-[24], the outer codes are block code, random linear erasure code and a fixed-rate version of the Raptor code, respectively. In Batched Sparse (BATS) codes [8], a rateless outer code is employed through a matrix generalization of a fountain code.

SUMMARY

Some aspects include a network system for increasing data throughput and decreasing transmission delay along a data link from a source node to a sink node via a relay node. The network system may comprise: a first node configured to encode a second plurality of data packets based on an estimated rank distribution expressing a quality of the data link and transmit the second plurality of data packets; and at least one second node. The at least one second node may be configured to: receive at least one of a first plurality of data packets transmitted from the first node prior to receiving at least one of the second plurality of data packets, estimate a rank distribution based on one or more of the first plurality of data packets, transmit the estimated rank distribution to the first node, and if the at least one second node has received a sufficient quantity of the first plurality of data packets, regenerate the first plurality of data packets.

Further aspects include at least one computer-readable storage medium encoded with executable instructions that, when executed by at least one processor, cause the at least one processor to perform a method for increasing data throughput and decreasing transmission delay along a data link from a source node to a sink node via a relay node. The method may comprise: receiving, from at least one relay node, one or more of a plurality of data packets; estimating a rank distribution expressing a quality of the data link based on the one or more of the plurality of data packets; transmitting the estimated rank distribution to a source node; and if a sufficient quantity of the plurality of data packets are received, regenerating and decoding the plurality of data packets.

Additional aspects include a network system for increasing data throughput and decreasing transmission delay along a data link from a source node to a sink node via a relay node. The network system may comprise: a source node configured to encode a plurality of data packets using rateless coding and transmit the plurality of data packets; and at least one relay node configured to: receive at least one of the plurality of data packets from the source node, and if the at least one relay node has received a sufficient quantity of the plurality of data packets: regenerate and re-encode the plurality of data packets, buffer the plurality of data packets until a transmit buffer can accommodate enough data packets to fill an entire batch with data packets, and relay the entire batch of data packets based on the transmit buffer holding enough data packets to fill the entire batch.

BRIEF DESCRIPTION OF THE DRAWINGS

FIGS. 12A, 12B, and 12C are diagrams illustrating an exemplary structure and header structures of data packets according to some embodiments.

DETAILED DESCRIPTION

Figure 1:
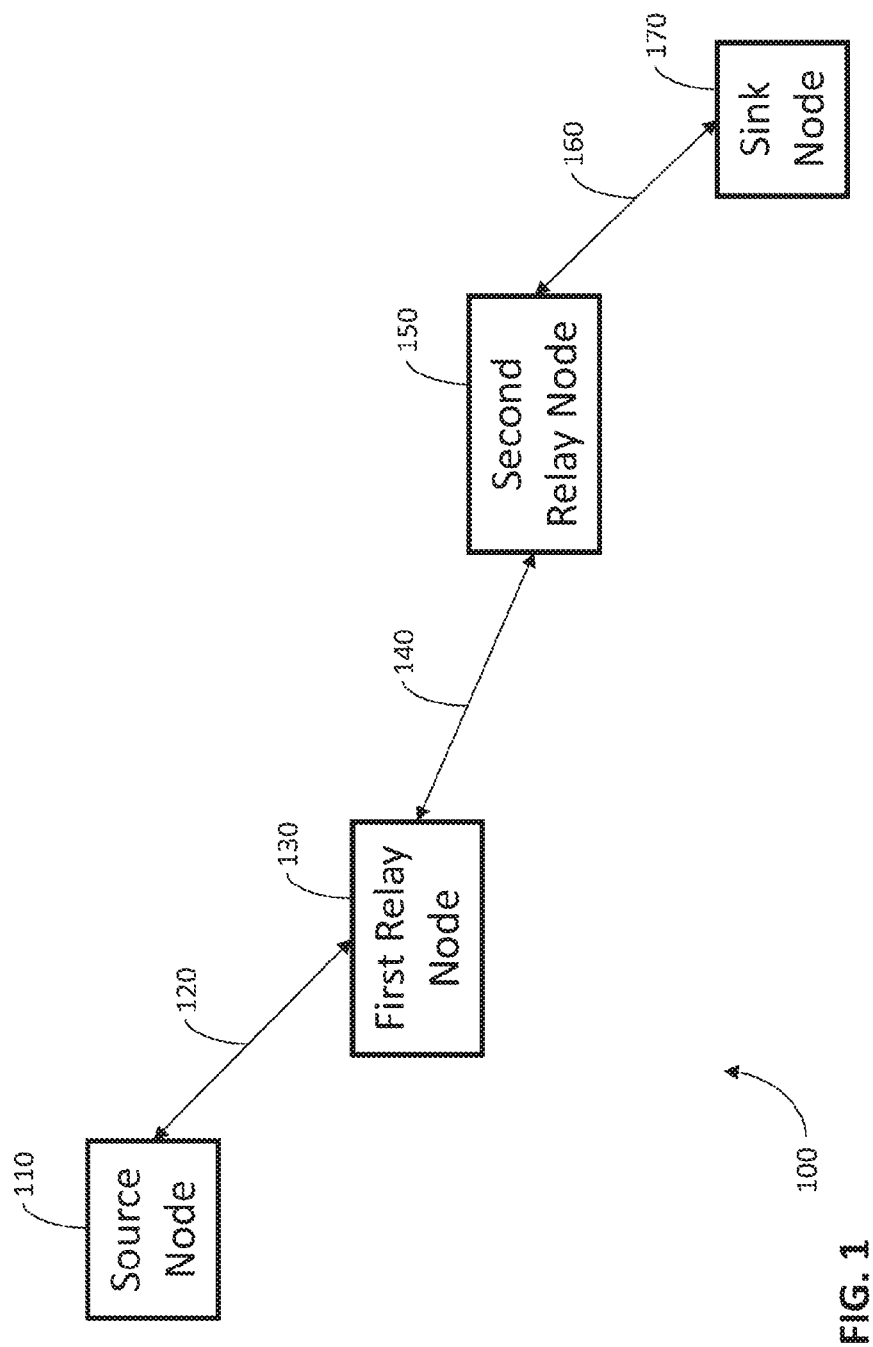
FIG. 1 is a block diagram illustrating an exemplary source node, relay nodes, and a sink (or destination) node of a network in which some embodiments of the application may be implemented.

As the inventors have recognized and appreciated, higher data throughput (rate of successful message delivery over a communication channel) and lower delay than other network coding methods for uncoordinated transmitting of the same data from multiple sources to one destination may be achieved with a method of Forward Error Correction (FEC), referred to herein as joint FoUntain coding and Network coding (FUN). Under the FUN coding approach, each source node may use a fountain code to encode information packets (native packets); each intermediate node (or a relay node) may use intra-session network coding to re-code the packets in the same batch of the same session received from the upstream node, and, if possible, may use cross-next-hop network coding to re-code packets destined to different next-hop nodes; a sink or destination node may decode the coded packets on the fly, and may be able to reconstruct all the native packets as long as it receives a sufficient number of coded packets to perform the reconstruction of the native packets. A "sufficient" number of coded packets may be assessed based on a fixed threshold. Alternatively or additionally, a "sufficient" number may be a dynamically established threshold. Herein, a unicast session may be identified by a unique source/destination IP address pair while a multicast session may be identified by a tuple of the source IP address and all the multicast receiver IP addresses.

The inventors have recognized and appreciated that an improved FUN coding approach may be attained by addressing several practical issues that may undermine the actual performance of the FUN coding approach (by causing throughput degradation, for example). These practical issues may include packet loss type, traffic pattern/fluctuation, and buffer overflow. The inventors have recognized and appreciated that accurately estimating the rank distribution of the data link between a source node and a sink node may address these issues and improve the performance of the FUN coding approach.

The rank distribution is a "signature" of the data link and contains the information about the data link an encoder can use to design an FUN coding scheme with improved performance. The rank distribution may include the probabilities of the ranks of received batches. A rank of a received batch is an indication of the number of linearly independent packets in the batch that are actually received. With an accurately estimated rank distribution, a well-informed FUN encoder can encode in an appropriate manner, thus carrying out the FUN coding scheme with improved performance. Specifically, this appropriate manner of encoding may be determined by feeding the rank distribution as input parameters into the encoding algorithm. Then, the algorithm may automatically generate a degree distribution according to the rank distribution. The degree distribution may specify how the encoder should process the native packets and encode them into coded packets. Therefore, the inventors have recognized and appreciated that an accurate rank distribution may enable a FUN encoder that leads to improved throughput.

The inventors have recognized and appreciated multiple ways in which to improve the accuracy of rank distribution estimation, thereby improving throughput. First, the inventors have recognized and appreciated that rank statistics of received batches may typically be measured at a sink or destination node, which may cause inaccurate rank distribution estimation. The inventors have recognized and appreciated that rank distribution may instead be measured through the ranks of received batches, measuring the rank of the end-to-end transfer matrix of the data link. The end-to-end transfer matrix may include additional nodes beyond merely the sink or destination node and the source node.

Second, the inventors have recognized and appreciated that unpredictable traffic congestions in even parts of the network may cause significant fluctuations in the end-to-end rank distribution. The inventors have recognized and appreciated that using batch-wise buffer insertion (i.e., holding the encoded/recoded batch until the buffer can accommodate M packets rather than feed the buffer whenever there is room for a single packet, as in packet-wise buffer insertion) may address this issue by stabilizing the perceived rank distribution at the sink or destination node.

Third, the inventors have recognized and appreciated that actual rank distribution may still fluctuate with dynamic wireless channel conditions. The inventors have recognized and appreciated that using a "pessimistic" rank distribution with a reduced average rank may address this issue by achieving robustness against estimation errors.

Implementation of the System

FIG. 1 is a diagram illustrating a system 100 that may employ techniques for increasing data throughput and decreasing transmission delay from a source node to a sink node via a relay node as described herein. In the example of FIG. 1, a source node 110 may encode data packets for transmission. According to some embodiments, the source node 110 may encode the data packets using fountain coding (as illustrated at stage 210 of FIG. 2). However, any suitable coding, including rateless coding, may be used to encode the data packets. The source node 110 may also transmit the data packets to a first relay node 130 via connection 120 (as illustrated at stage 220 of FIG. 2), which may be a wireless connection. However, any suitable connection or communication technology may be used to communicate among the nodes.

Figure 2:
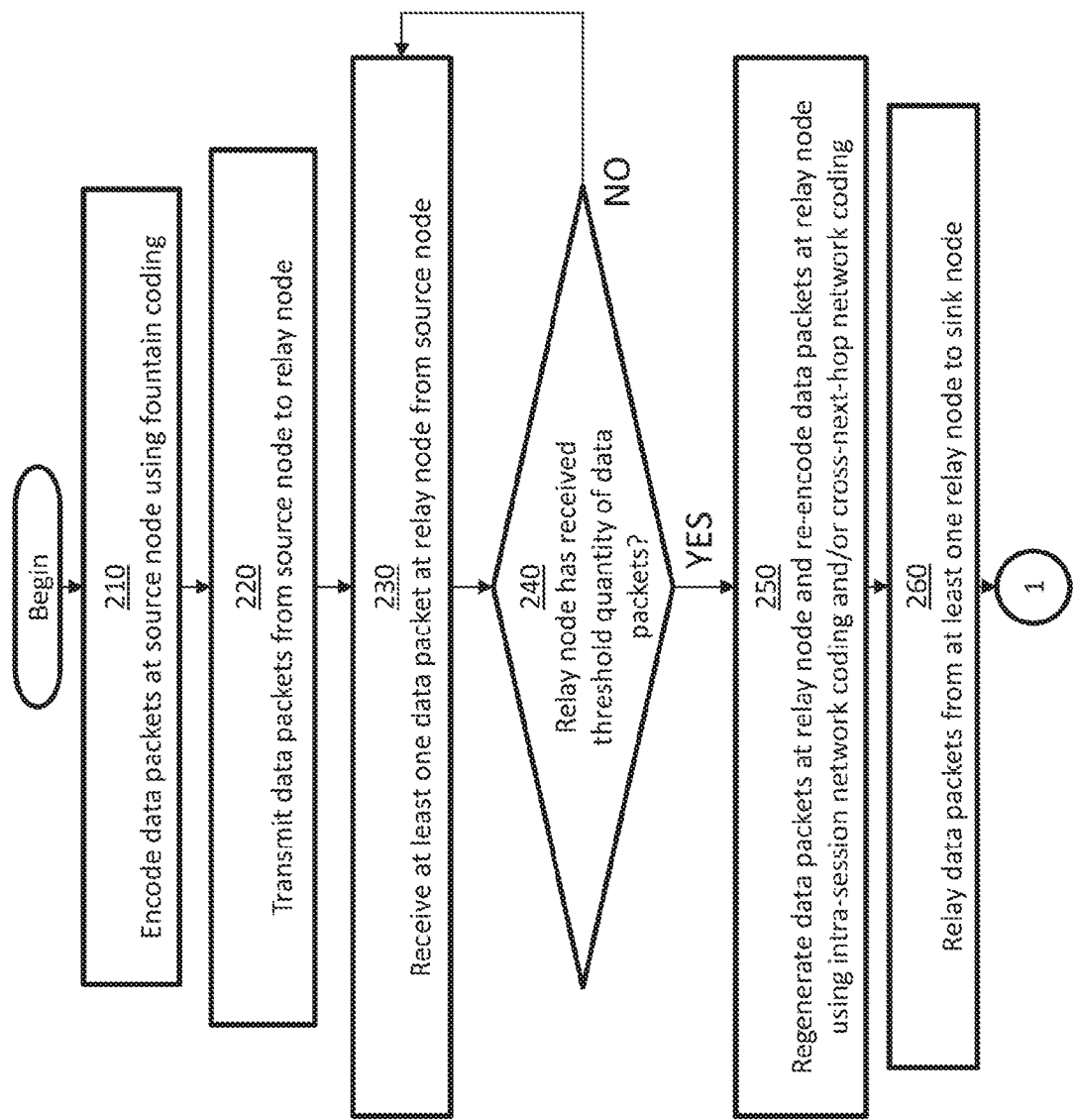
FIGS. 2 and 3 are a flowchart of an exemplary method of increasing data throughput and decreasing transmission delay from a source node to a sink node via a relay node according to some embodiments.
Figure 4:
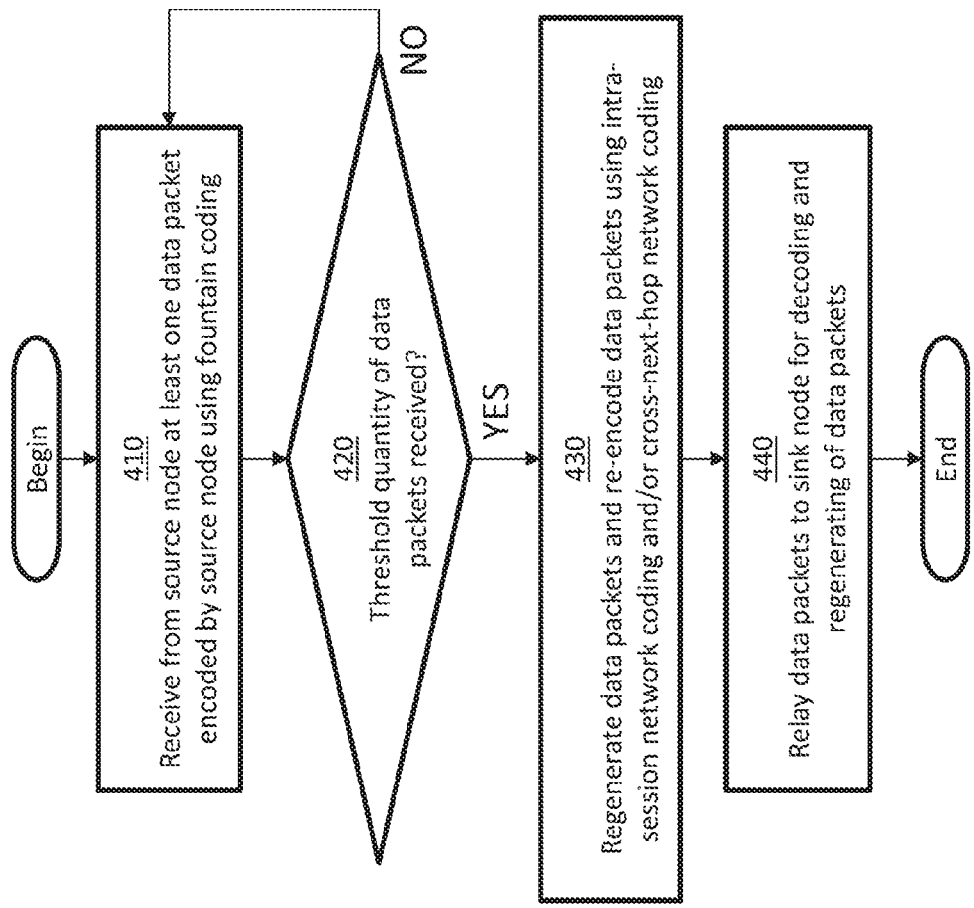
FIG. 4 is a flowchart of an additional exemplary method of increasing data throughput and decreasing transmission delay from a source node to a sink node via a relay node according to some embodiments.

The first relay node 130 may receive at least one of the data packets from the source node 110 (as illustrated at stage 230 of FIG. 2 and stage 410 of FIG. 4). If the first relay node 130 has received a sufficient quantity of the data packets needed to perform regeneration of the data packets (as illustrated at stage 240 of FIG. 2 and stage 420 of FIG. 4), the first relay node 130 may regenerate and re-encode the data packets (as illustrated at stage 250 of FIG. 2 and stage 430 of FIG. 4). As discussed above, a "sufficient" number of data packets may be assessed based on a fixed threshold and/or a dynamic threshold. According to some embodiments, the first relay node 130 may combine multiple of the plurality of packets for retransmission; alternatively or additionally, the first relay node 130 may re-encode the data packets using intra-session network coding and/or cross-next-hop network coding (as illustrated at stage 250 of FIG. 2 and stage 430 of FIG. 4). However, any suitable coding may be used to re-encode the data packets. In addition, the first relay node 130 may relay or transmit the data packets to a second relay node 150 via connection 140 (as illustrated at stage 260 of FIG. 2 and stage 440 of FIG. 4), which may be a wireless connection.

The second relay node 150 may receive at least one of the data packets from the first relay node 130. If the second relay node 150 has received a sufficient quantity of the data packets, the second relay node 150 may regenerate and re-encode the data packets. According to some embodiments, the second relay node 150 may combine multiple of the plurality of packets for retransmission; alternatively or additionally, the second relay node 150 may re-encode the data packets using intra-session network coding and/or cross-next-hop network coding. In addition, the second relay node 150 may relay or transmit the data packets to a sink node 170 via connection 160, which may be a wireless connection.

In some embodiments, source node 110 may be a server. Additionally, sink node 170 may be a client—for example, a client of the server referred to as source node 110. Alternatively or additionally, relay nodes, such as first relay node 130 and/or second relay node 150, may include network routers and/or network switches. In some embodiments, relay nodes, such as first relay node 130 and/or second relay node 150, may include hubs, and/or any other suitable components.

In some embodiments, the first relay node 130 and/or the second relay node 150 may regenerate, re-encode, and relay the data packets conditionally, based on the quantity of the data packets received at the given relay node. For example, the first relay node 130 and/or the second relay node 150 may receive a subset of the data packets, and based on the subset of the data packets, the first relay node 130 and/or the second relay node 150 may regenerate the data packets, re-encode the regenerated data packets, and transmit the regenerated, re-encoded data packets.

Figure 3:
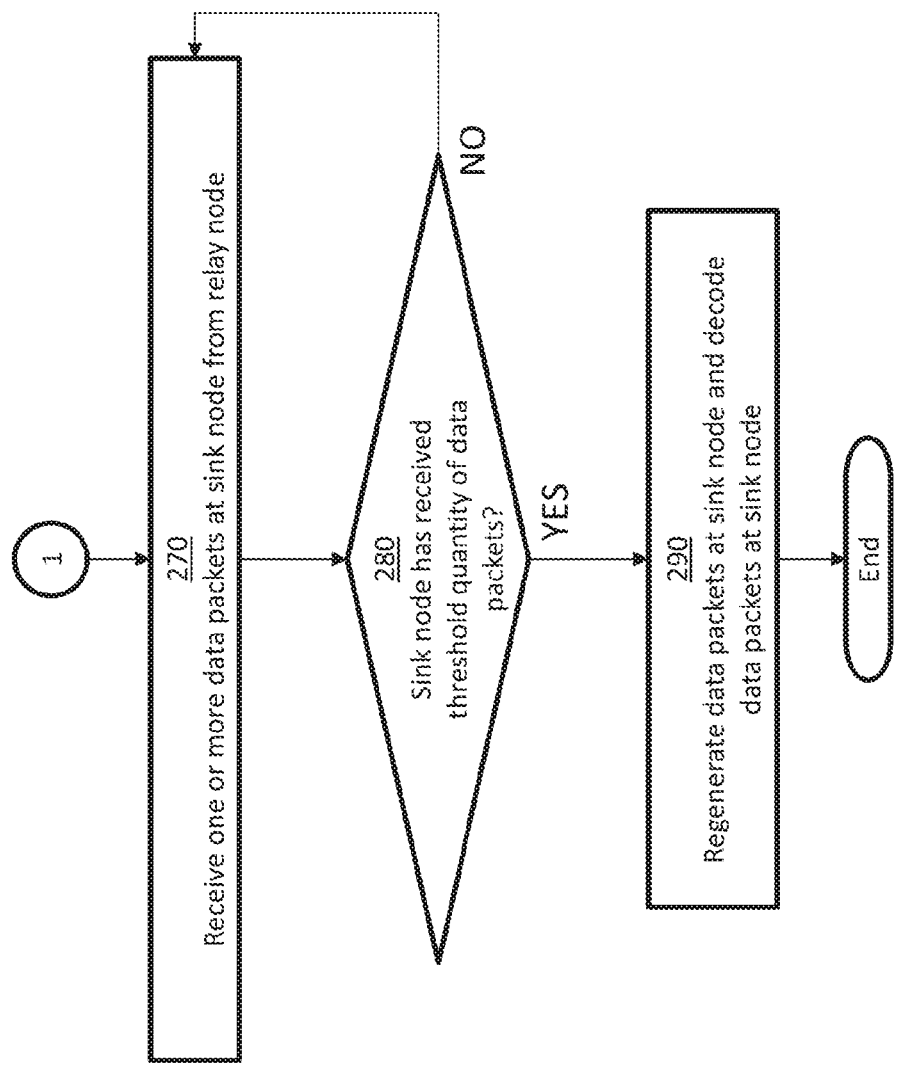

The sink node 170 may receive one or more data packets from the second relay node 150 (as illustrated at stage 270 of FIG. 3). If the sink node 170 has received a sufficient quantity of the data packets (as illustrated at stage 280 of FIG. 3), the sink node 170 may regenerate and decode the data packets as shown in FIG. 2 (as illustrated at stage 290 of FIG. 3).

FIG. 1 shows only two relay nodes, the first relay node 130 and the second relay node 150. This number of relay nodes is shown for simplicity of illustration. It should be appreciated that a network system may have many more nodes and relay nodes.

According to some embodiments, a "first" node (e.g., source node 110 or potentially one of first relay node 130 or second relay node 150) may, prior to transmitting "second" data packets, transmit "first" data packets. A "second" node (e.g., first relay node 130, second relay node 150, or sink node 170) may receive at least one of the first data packets transmitted from the first node prior to receiving at least one of the second data packets (as illustrated at stage 510 of FIG. 5). The second node may receive the first data packets from the first node via at least one relay node. If the second node is a relay node, the second node may, prior to receiving at least one of the second data packets from the first node, receive at least one of the first data packets from the first node and relay the at least one of the first data packets.

In some embodiments, the first data packets may be full-rank batches. A full-rank batch may be a batch whose M coded packets are linearly independent, where M is the size of the batch. A full-rank batch may thus have a rank of M. The size of the batch may be the upper limit on the number of packets per batch.

For further illustration of a full-rank batch, consider having only one native packet and encoding the one native packet into a batch of M coded packets: in this example, the rank of the batch is one because all coded packets are identical in this example. On the other extreme, consider having greater than or equal to M native packets and encoding them into a batch of M coded packets using a full-ranked encoding matrix (such as with full-rank batches): in this example, the rank of the batch is M.

In some embodiments, the batch size M may be between about 1 and 20. For example, the batch size M may be 1.6 or 16. The inventors have recognized and appreciated that, theoretically, higher values of M may result in higher throughput. However, the inventors have also recognized and appreciated that a larger M may also consume more computational and communication overhead. The inventors have recognized and appreciated that, empirically, as M increases, the throughput gain may diminish. Therefore, in practice, a cost-effective M may be found by considering both the throughput performance and the hardware budget. Such considerations may be done in any suitable way, such as dynamically in a deployed network by adapting M and measuring the effect on throughput. Alternatively or additionally, a network may be simulated prior to deployment using various values of M, such that the M with highest throughput may be selected.

These full-rank batches sent first may be referred to as "pilot" batches, as discussed below. Additionally, the number of full-rank batches used as pilot batches may be between about 20 and 60 full-rank batches.

Figure 5:
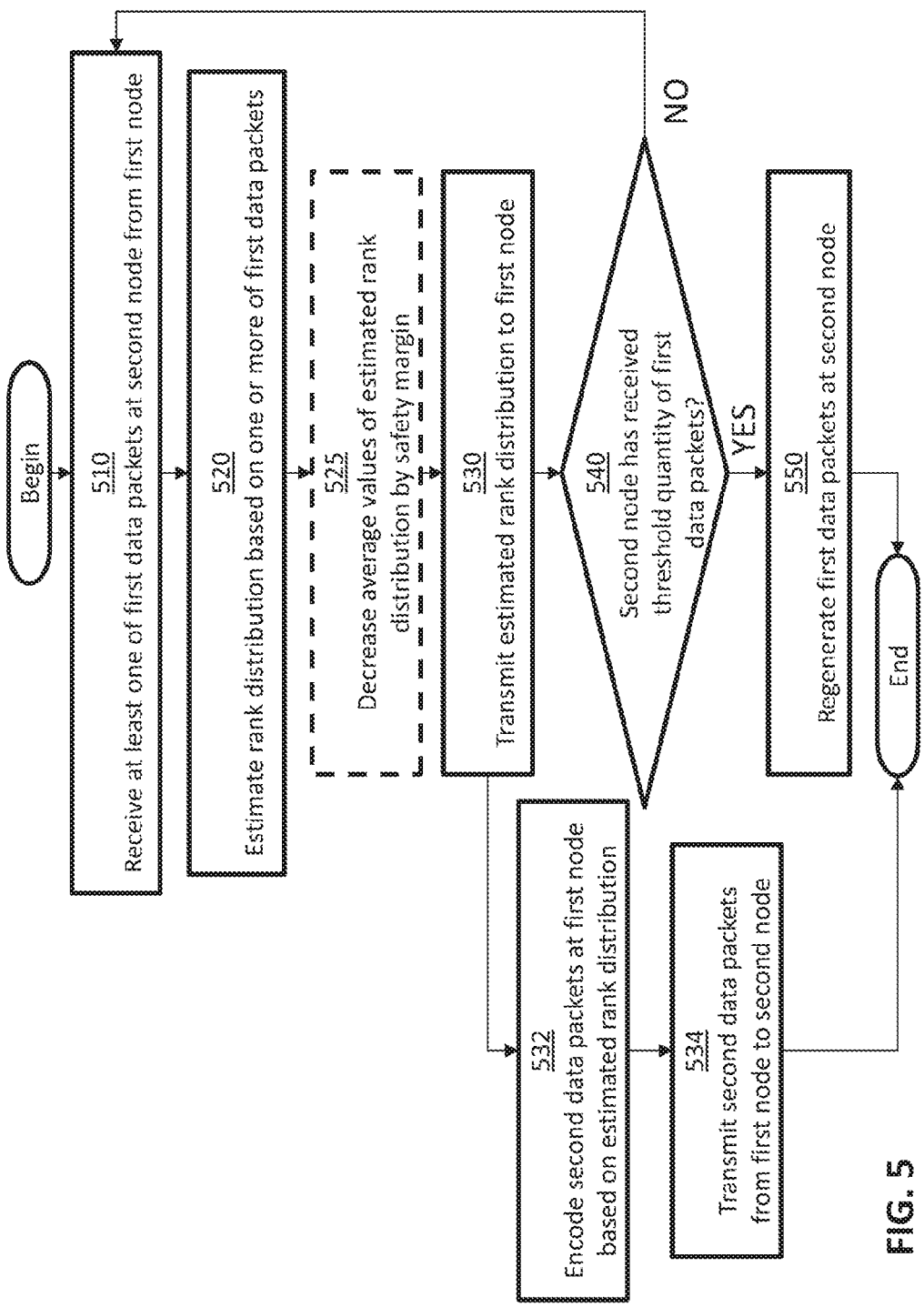
FIG. 5 is a flowchart of a modified exemplary method of increasing data throughput and decreasing transmission delay from a source node to a sink node via a relay node according to some embodiments.

Additionally, the second node may estimate a rank distribution, which may express a quality of the data link from the first node to the second node, based on one or more of the first data packets (as illustrated at stage 520 of FIG. 5). The quality of the data link from the first node to the second node may correspond to a number of packets lost and/or a percentage of packets lost.

In some embodiments, the second node may estimate the rank distribution as follows: by counting the ranks of the received batches (e.g., using a counter to count the occurrences of ranks of the received batches); after receiving sufficient batches (e.g., all pilot batches), generating a histogram from the ranks of received batches; and using the histogram to approximate the actual rank distribution of a channel represented by an end-to-end transfer matrix (e.g., treating the histogram as the estimated rank distribution). The second node may estimate the rank distribution in Layer 2.

In some embodiments, the second node may transmit the estimated rank distribution to the first node (as illustrated at stage 530 of FIG. 5). Additionally, the second node may, prior to transmitting the estimated rank distribution, decrease average values of the estimated rank distribution by a safety margin. The safety margin may be between 1 percent of the estimated rank distribution and 7 percent of the estimated rank distribution. In some embodiments, the safety margin may be a parameter that is programmed into at least one of the nodes (e.g., a sending node such as the second node). For a node implemented as a computing device such as a server, that programming may be in the operating system of the device. Alternatively or additionally, the programming may be in firmware, non-volatile memory, or a register of a network interface. As with other parameters described herein, the value of the safety margin may be empirically tuned during the set-up phase of a network in order to provide an appropriate value for the particular operating environment of the node. Alternatively or additionally, the parameter values may be determined by computation or simulation prior to network deployment.

If the second node has received a sufficient quantity of the first data packets, the second node may regenerate the first data packets (as illustrated at stages 540 and 550 of FIG. 5) (and the second node may decode the second data packets, at least if the second node is a sink node). Otherwise, the second node may return to receiving data packets and not regenerate the first data packets. If the second node is a relay node and has received a sufficient quantity of the second data packets, the second node may regenerate, re-encode, and relay the second data packets to an additional relay node or sink node 170.

Additionally, the first node may receive the estimated rank distribution (e.g., via at least one relay node that may relay the estimated rank distribution) and encode second data packets based on the estimated rank distribution using rateless coding (as illustrated at stage 532 of FIG. 5). The first node may then transmit the second data packets to the second node (as illustrated at stage 534 of FIG. 5). Additionally, the first node may acknowledge the estimated rank distribution. For example, the first node may transmit an acknowledgment message to the second node acknowledging receipt of the estimated rank distribution.

Figure 6:
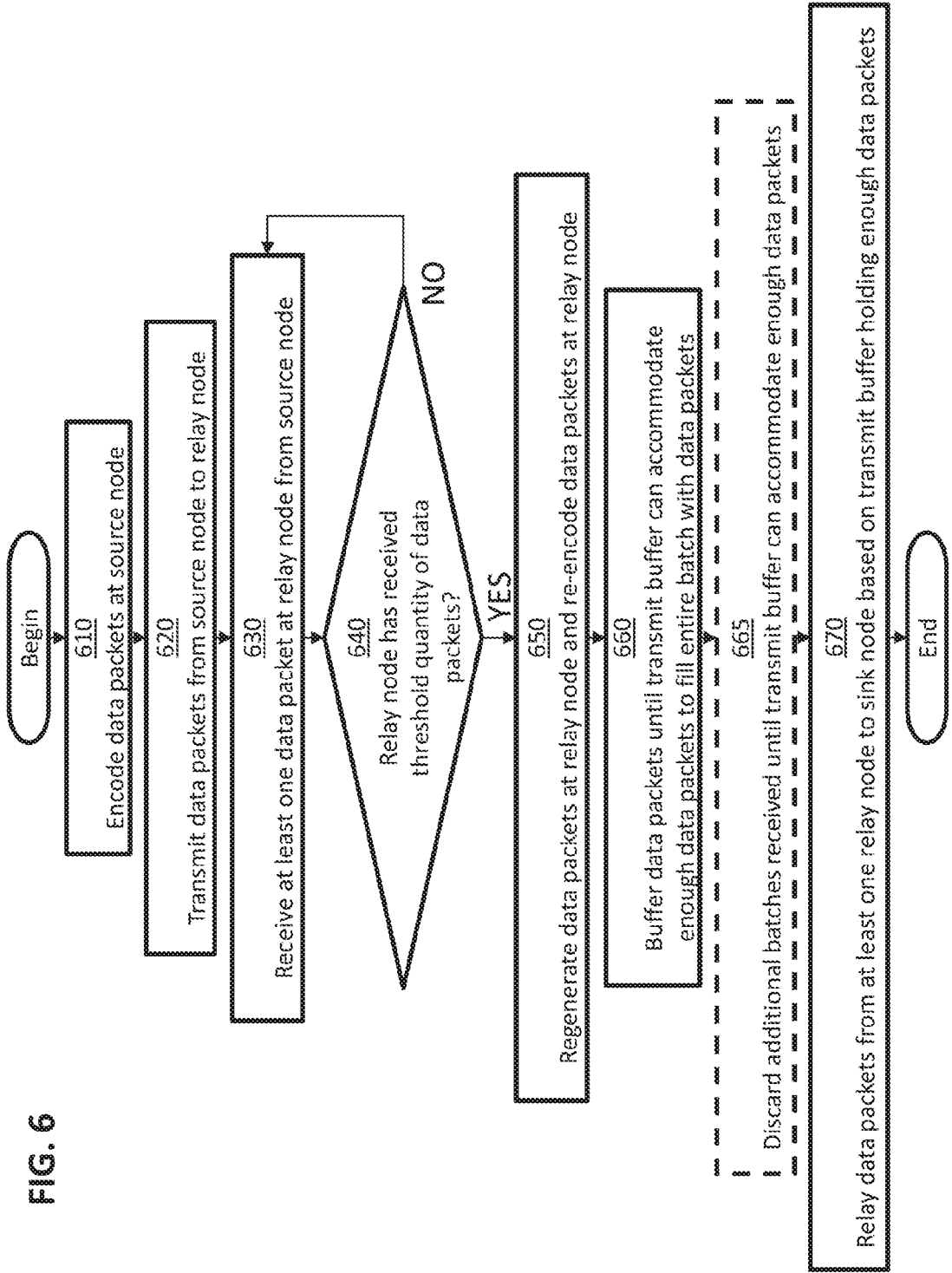
FIG. 6 is a flowchart of an additional modified exemplary method of increasing data throughput and decreasing transmission delay from a source node to a sink node via a relay node according to some embodiments.

According to some embodiments, source node 110 may encode data packets using rateless coding (as illustrated at stage 610 of FIG. 6) and transmit the data packets (as illustrated at stage 620 of FIG. 6). At least one relay node (e.g., first relay node 130 and/or second relay node 150) may receive at least one of the data packets from the source node 110 (as illustrated at stage 630 of FIG. 6).

The at least one relay node may determine whether a sufficient quantity of the data packets has been received (as illustrated at stage 640 of FIG. 6). If so, the at least one relay node may regenerate and re-encode the data packets (as illustrated at stage 650 of FIG. 6), buffer the data packets until a transmit buffer can accommodate enough data packets to fill an entire batch with data packets (as illustrated at stage 660 of FIG. 6), and relay the entire batch of data packets based on the transmit buffer holding enough data packets to fill the entire batch (as illustrated at stage 670 of FIG. 6).

In some embodiments, the at least one relay node may discard additional received batches until the transmit buffer can accommodate enough data packets to fill the entire batch with data packets (as illustrated at stage 665 of FIG. 6). Alternatively or additionally, the at least one relay node may estimate a rank distribution based on the entire batch of data packets and transmit the estimated rank distribution to the source node 110. Additionally, the at least one relay node may, prior to transmitting the estimated rank distribution, decrease average values of the estimated rank distribution by a safety margin. As discussed above, the safety margin may be between 1 percent of the estimated rank distribution and 7 percent of the estimated rank distribution.

Description of FUN Coding

As discussed above, some embodiments described herein relate to an improvement to the FUN coding approach. First, a description of some embodiments of the FUN coding approach are described below, explaining the FUN coding approach. Then some embodiments relating to improvements to the FUN coding approach are described.

FUN Overview

We consider an L-hop network consisting of a pair of end nodes, say Node 1 and Node L+1, and L−1 relay nodes. Assume that there are two unicast flows between the two end nodes, i.e., a forward flow from Node 1 to Node L+1 and a backward flow from Node L+1 to Node 1. The hops are indexed from Hop 1 to Hop L with respect to the forward flow. Embodiments of coding schemes include FUN-1 and FUN-2:

According to some embodiments, a FUN-1 relay node may need to know the transfer matrix of the next-hop node, in addition to its own packet, to recover a BATS coded packet.

According to further embodiments, each FUN-2 relay node may need to add a new encoding vector to the header of a re-coded packet; only the destination node may perform decoding.

Under some embodiments according to FUN-1, two sub-layers, i.e., Layer 2.1 and Layer 2.2, may be inserted between Layer 2 (MAC) and Layer 3 (IP). Layer 2.1 may be for cross-next-hop network coding. Layer 2.2 may be for BATS coding [8]. At a source node, Layer 2.2 may use a fountain code to encode all native packets from upper layers; there may be no Layer 2.1 at a source node. At a relay node, Layer 2.1 may be used for cross-next-hop network coding and Layer 2.2 may be used for intra-session network coding; for Layer 2.2, the relay node may run a procedure called FUN-1-2.2-Proc, which may perform RLNC within the same batch. At a destination node, Layer 2.2 may decode the coded packets received; there may be no Layer 2.1 at a destination node.

Under some embodiments according to FUN-2, only one sub-layer, i.e., Layer 2.2, may be inserted between Layer 2 (MAC) and Layer 3 (IP). At a source node, Layer 2.2 may use a fountain code to encode all native packets from upper layers. At a relay node, if Layer 2.2 receives a packet with FUN2 switch enabled, it may run a procedure called FUN-2-2.2-Proc for mixing packets from two flows; otherwise, it may run the procedure FUN-1-2.2-Proc, which may not mix packets from two different flows. Note that different from a BATS code, FUN-2-2.2-Proc may perform re-coding of batches from two different flows. At a destination node, Layer 2.2 may decode the coded packets received.

FUN-1

Assume a source (Node 1) wants to transmit a file consisting of K native packets to a destination (Node L+1) over L hops. Each packet, denoted by a column vector in $\mathbb{F}_q^T$, may have T symbols in a finite field $\mathbb{F}_q$, where q may be the field size. The set of K native packets may be denoted by the following matrix $$B=[b_1, b_2, \ldots, b_K], \quad (1)$$

where $b_i$ may be the i-th native packet. When treating packets as elements of a set, we may write $b_i \in B$.

1) Precoding of FUN-1: At a source node, precoding may be performed. The precoding can be achieved by a traditional erasure code such as LDPC and Reed-Solomon code. The precoding of FUN-1 may be performed at a source node at Layer 2.2. After precoding, the output packets may be further encoded by the outer encoder of FUN-1.

2) Outer Code of FUN-1: The outer code of FUN-1 may also be performed at a source node at Layer 2.2. Specifically, a source node may encode the K native packets into a potentially unlimited number of batches, each containing M coded packets. The i-th batch $X_i$ may be generated from a subset $B_i \supset B$ ($B \in \mathbb{F}_q^{T \times K}$ by the following operation $$X_i = B_i G_i, \quad (2)$$

where $G_i \in \mathbb{F}_q^{d_i \times M}$ may be called the generator matrix of the i-th batch; $B_i \in \mathbb{F}_q^{T \times d_i}$; $X_i \in \mathbb{F}_q^{T \times M}$. $B_i$ may be randomly generated by two steps: 1) sample a given degree distribution $\Psi = (\Psi_1, \Psi_2, \ldots, \Psi_K)$ and obtain a degree $d_i$ with probability $\Psi d_i$; 2) uniformly and randomly choose $d_i$ packets from B to form $B_i$. Matrix $G_i$ may be randomly generated, with all entries independently and identically chosen from $\mathbb{F}_q$ according to a uniform distribution.

3) Inner Code of FUN-1: A relay node, after receiving the packets within the same batch, may encode them into new packets by taking random linear combinations. Specifically, random linear network coding (RLNC) may be performed at Layer 2.2 within the same batch. Denote by $Y_{i,l}$ the set of packets in the i-th batch that is correctly received by node l, the forward flow may evolve as follows $$Y_{i,l+1} = \begin{cases} X_i E_{i,1}, & l = 1, \\ Y_{i,l} H_{i,l} E_{i,l}, & l > 1, \end{cases} \quad (3)$$

where $E_i,1$ may be the erasure matrix of Hop 1. Specifically, $E_{i,l}$ is an M×M diagonal matrix whose entry may be one if the corresponding packet is correctly received by Node l+1, and may be zero otherwise. $H_{i,l} \in \mathbb{F}_q^{M \times M}$ may be the recoding matrix of an RLNC for the i-th batch at Node l.

At the destination (Node L+1), denoted by $Y_i$ the i-th received batch of the forward flow, we may have $$Y_i \triangleq Y_{i,L+1} = X_i E_{i,1} H_{i,2} E_{i,2} \ldots H_{i,L} E_{i,L} \triangleq X_i H_i \quad (4)$$

where $H_i = E_{i,1} H_{i,2} E_{i,2} \ldots H_{i,L} E_{i,L} \in \mathbb{F}_q^{M \times M}$ may be called the transfer matrix for the i-th batch, which may also be added to the header of a corresponding coded packet as a global encoding vector.

Similarly, the inner code for the j-th batch of the backward flow may be denoted as below $$\bar{Y}_j \triangleq \bar{Y}_{j,1} = \bar{X}_j \bar{E}_{j,L} \bar{H}_{j,L} \ldots \bar{E}_{j,2} \bar{H}_{j,2} \bar{E}_{j,1} \triangleq \bar{X}_j \bar{H}_j. \quad (5)$$

4) XOR Coding of FUN-1: At a relay node, the XOR coding and decoding of FUN-1 may be performed at Layer 2.1. At Node 1, if the output queues of Layer 2.2 for the forward flow (from Node 1−1) and the backward flow (from Node 1+1) both have at least one batch of M re-coded packets, packet-wise XOR operation may be performed on both batches to generate M XOR coded packets, i.e., pm=yi, m⊕ȳ⁻j, m, ∀m∈(1, . . . , M), where yi, m may be m-th recoded packet of the i-th batch for the forward flow, $\mathcal{Y}$ i, m may be the m-th recoded packet of the j-th batch for the backward flow, and $\mathcal{P}$ m may be the m-th XOR coded packet. After the XOR operation, the FUN_XOR bit may be enabled and the following information may be put in the header of each XOR coded packet: 1) packet ID m, 2) the MAC address of the next-hop node of Packet $\mathcal{Y}$ i, m, 3) batch ID i of Packet $\mathcal{Y}$ i, m, 4) the MAC address of the next-hop node of packet $\mathcal{Y}$ j, m 5) batch ID j of packet $\mathcal{Y}$ j, m, 6) local encoding vectors of packets $\mathcal{Y}$ j, m and $\mathcal{Y}$ j, m. Otherwise if only one flow has output from Layer 2.2, no operation may be performed in Layer 2.1 and the FUN_XOR bit may be disabled.

5) Decoding of FUN-1: At Layer 2.1, the XOR decoding may be performed locally at relay nodes, in which a packet from the forward flow can be recovered by XORing the XOR coded packet with the corresponding packet from the backward flow, i.e. yi, m=pm⊕ȳ⁻j, m, ∀m∈{1, . . . , M}. Similar operation may be performed to recover a packet from the backward flow, i.e., yj, m=pm⊕yi, m, ∀m∈ {1, . . . , M}. At Layer 2.2, however, decoding may be performed at the end nodes, i.e., Node 1 and Node L+1, to recover the K native packets. Belief propagation (BP) may be used to decode the outer code and inner code of FUN-1.

FUN-2

FUN-2 may consist of outer code, inner code, and precoding. The precoding and outer code of FUN-2 may be the same as FUN-1. The differences of FUN-2 may lie in the inner code and decoding parts. To limit the size of the encoding vector in the packet header, FUN-2 may only allow the mixing of two batches from two flows once; i.e., if a packet is already a mixture of two packets from two flows, it may not be re-coded again at a relay node. Also, to alleviate computational burden at relay nodes, the mixed packets may not be recovered immediately but only to be decoded at the two end nodes, i.e., Node 1 and Node L+1.

1) Inner Code of FUN-2: The inner code of FUN-2 may be similar to the inner code of FUN-1 in the sense that both of them use RLNC. The difference may be that, FUN-2 may not perform XOR coding to mix two flows as FUN-1 does, but may embed this function in the inner code of FUN-2. Besides, the mixing of packets from two flows may be performed only once, instead of many times. The way of mixing may also be slightly different, i.e., through RLNC rather than XOR coding.

Under FUN-2, if the two flows are mixed at Node 1, the inner coding may be the same as FUN-1 until the two flows meet at Node 1. At Node 1, the following re-coding may be applied to two juxtaposed matrices of received packets:

$$Z_{i\oplus j,l} = [Y_{i,l}, \overline{Y}_{j,l}] H_{i\oplus j,l} \quad (6)$$
$$= [Y_{i,l-1} H_{i,l-1} E_{i,l-1}, \overline{Y}_{j,l+1} \overline{H}_{j,l+1} \overline{E}_{j,l}] H_{i\oplus j,l},$$

where $Z_{i\oplus j,l} \mathbb{F}_q^{T\times K}$ may contain the M re-coded packets generated by Node l; $H_{i\oplus j,l} \triangleq [Hi,l,Hj,l]^T \in \mathbb{F}_q^{2M \times M}$ may be the transfer matrix of an RLNC for the i-th batch of the forward flow and the j-th batch of the backward flow at Node 1. After inner-encoding, each column of the matrix $H_{i\oplus j,l}$ may be added to the global encoding vector of the corresponding coded packets.

All M re-coded packets in $Z_{i\oplus j,l}$ may be broadcasted from Node l to both Node l+1 and Node l−1 over the erasure channels of Hop l−1 and Hop l+1, respectively.

$$Y_{i,l+1} = Z_{i\oplus j,l} E_{i,l},$$
$$\overline{Y}_{i,l-1} = Z_{i\oplus j,l} \overline{E}_{i,l-1},$$

Beyond Node 1, all relay nodes may continue to re-code in the same way as FUN-1. That is, the i-th batch of the forward flow and the j-th batch of the backward flow may be recoded according to (4) and (5), respectively.

2) Decoding of FUN-2: In the decoding process, the destination node of the forward flow may also be a source node of the backward flow. So this destination node can use its known packets of the backward flow to decode the coded packets of the forward flow.

According to (4), (5) and (6), the destination (Node L+1) may receive the following batch in the forward flow $$Y_{i\oplus j,L+1} = [X_i E_{i,1} \ldots H_{i,L-1} E_{i,L-1}, \overline{X}_j \overline{E}_{j,L} \ldots \overline{H}_{j,l+1} \overline{E}_{j,l}] \times \quad (7)$$
$$[H_{i,l}, \overline{H}_{j,l}]^T E_{i,l} H_{i,l+1} \ldots H_{i,L} E_{i,L}$$
$$= X_i H_i + \overline{X}_j \overline{E}_{j,L} \ldots \overline{H}_{j,l+1} \overline{E}_{j,l} \overline{H}_{j,l} \times$$
$$E_{i,l} H_{i,l+1} \ldots H_{i,L} E_{i,L}$$
$$\triangleq X_i H_i + \overline{X}_j \tilde{H}_j,$$

where $\overline{X}_j$ may be the packets injected to the backward flow which may be known to the destination, and $\tilde{H}_j$ may be contained in the global encoding vectors. Therefore, $Y_i$ can be recovered by subtracting the latter part $$Y_i = X_i H_i = Y_{i\oplus j,L+1} - \overline{X}_j \tilde{H}_j.$$

The backward flow can be similarly processed to recover $\overline{Y}_j$. The rest part of FUN-2 decoding may be the same as FUN-1.

Practical Issues in a Multi-Hop Network

Packet Loss Type

For a FUN coded end-to-end traffic flow, packet losses from Layer 1 to Layer 3 can be categorized into four cases.

1) Layer 1: wireless channel error: This type of packet loss can be naturally compensated by the inner codes (RLNC recoding) of FUN codes. Under deep channel fading or high noise level, more packets in a batch may be lost. In FUN codes, the recoding matrix $H_{i,l}$ may automatically generate and transmit more redundant packets at each hop so that more packets can get through.

2) Layer 2.1: congestion and collision: This type of packet loss may not be solved through FUN coding. This is because recoding further increases packet transmissions, which may aggravate congestion and cause more collisions. The resulting higher packet loss ratio may undermine the achievable throughput.

3) Layer 2.2: buffer overflow: This type of packet loss also may not be solved by FUN coding alone. Coding rate and service rate correspond to a buffer's input and output rates, respectively. For an already overflowed buffer, additional coded packets may simply be discarded and wasted.

4) Layer 3: re-routing: This type of packet loss can be well compensated by the outer code (fountain code) of FUN codes. For retransmission-based schemes (e.g., TCP), all packets on the failed path may need to be identified for retransmission, which may incur expensive protocol overhead. However, any sufficiently large subset of coded packets can be used for FUN decoding.

The Effect of Traffic Pattern

The main difference between a FUN relay node and a router may be that the former performs code-and-forward, while the latter is store-and-forward. This difference may lead to a significant impact on the network traffic pattern. For a store-and-forward multi-hop lossy network, the packet forwarding rate may usually diminish as a network flow proceeds. For a FUN coded multi-hop lossy network, however, the forwarding rate may remain steady thanks to the recoding capability at relay nodes. Although this code-and-forward fashion of FUN codes may usually contribute to throughput gain in a multi-hop network, it may also produce negative effects in some special cases. For example, when packet injection rate from source nodes is too high, all relay nodes may also generate excessive packets to jam the network. According to some embodiments, the FUN coding approach described herein may be implemented on a router. Alternatively or additionally, a FUN relay node may be a router.

According to some embodiments, accurately estimating the rank distribution of the data link between a source node and a sink node may address the effect of traffic pattern and improve the performance of the FUN coding approach, as described herein.

The Effect of Buffer Overflow

Figure 7:
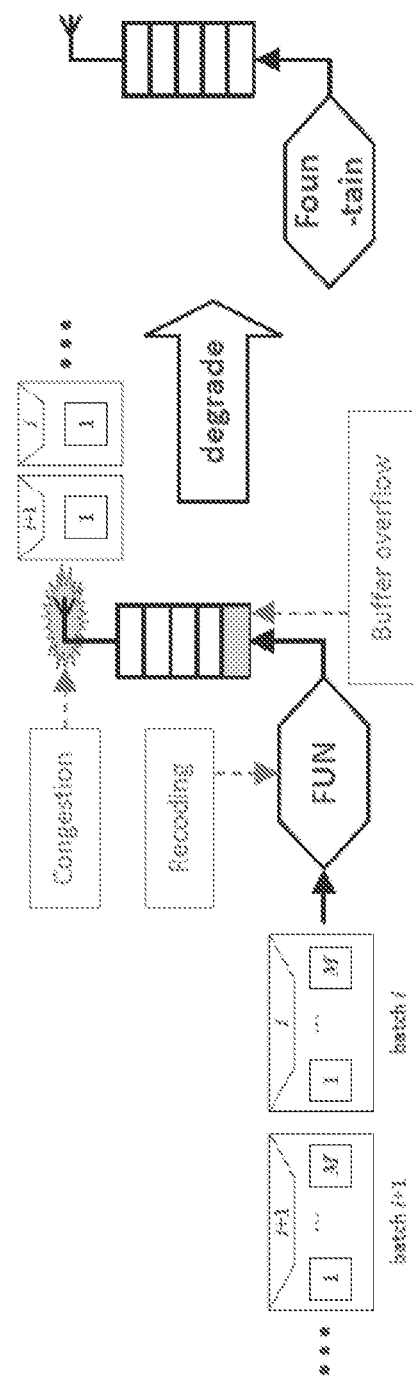
FIG. 7 is a diagram of an effect of severe congestion on some embodiments.

For FUN codes, the negative consequence of buffer overflow can be understood through the following example. When the re-coding rate is much higher than service rate, a great proportion of packets may be discarded at the transmit buffer. As a result, the rank of each received batch may become very low. In the extreme case where the ranks of all batches reduce to ones (or zero if the whole batch is lost), FUN codes may degrade to a fountain code as shown in FIG. 7. The underlying reason may be that FUN codes are structured codes in the sense that packets are grouped into batches. A disrupted rank distribution of the received batches may affect the optimality of FUN codes and cause throughput degradation.

One may argue that such severe buffer overflow rarely occurs or can be avoided because the data rate can be reduced. Unfortunately, this may not usually be the case. First, network congestions and traffic fluctuations can be unpredictable and quite common in a practical ad-hoc network. Second, such a congestion even in one out of the many hops may alter the entire structure of FUN codes. Both factors make it difficult to exempt FUN from the negative effects. Moreover, the afore-mentioned phenomenon may easily occur.

According to some embodiments, batch-wise buffer insertion may eliminate the effect of buffer overflow on end-to-end transfer matrices, as described herein.

FUN Coding Analysis

FUN-1 Analysis

1) One-way capacity: for a FUN coded single flow, the capacity of an L-hop network may be the arrival rate of linearly independent packets at the destination. Note that this may be different from fountain codes, in which each coded packet can be regarded as an innovative packet, and the number of linearly independent packets may simply be the count of received packets. For FUN codes, redundant packets may be added during recoding at relay nodes, and should be deducted when calculating the amount of useful information. Specifically, the number of linearly independent packets can be calculated according to the following two properties:

Packets from different batches may be independent;
Within the same batch, the number of independent packets may equal the rank of the batch.

Therefore, the normalized capacity of a FUN coded single flow may be $$C_L^{FUN,one-way} = \lim_{n\to\infty} \frac{\sum_{i=1}^{n}(rk(H_i))}{n \cdot M} = \frac{\sum_{r=0}^{M}(r \cdot h_{r,L})}{M}, \quad (8)$$

where n may be the number of received batches, rk(.) may denote the rank of a matrix, and $h_{r,L}$ may denote the probability that $H_i$, the transfer matrix of the i-th batch through an L-hop network, has rank r.

2) Two-way gain: For FUN-1, the throughput gain of two-way communication over one-way communication may be mainly from combining the packets from two flows. The gain can be evaluated by counting the channel uses saved by the XOR-and-broadcast operation. For a two-hop network, for example, if both end nodes have one packet to transmit, XOR-and-broadcast can reduce the number of channel uses from 4 to 3. The gain may thus be 4/3 compared with not coding. In fact, one channel use can be saved from each XOR-and-broadcast operation. The analysis may be extended to an L-hop network with a balanced two-way traffic[1], i.e., each end node may want to transfer a K-sized file to the other. Specifically, the analysis may be divided into two cases: (i) the even L case and (ii) the odd L case.

[1] The generalization to an unbalanced two-way traffic is straight forward as it can be viewed as a combination of a balanced two-way traffic and a one-way traffic.

The even L case: if the two end nodes start transmission simultaneously[2], the first packets from both the forward and backward flows may meet at the middle node (Node L/2+1). If n batches are to be transferred for both flow, the last packets from both flows may also meet at Node L/2+1. Therefore, every packet transmission by Node L/2+1 may be a broadcast. Finally, the number of broadcasts by Node L/2+1 may be n×M, which equals the number of channel uses saved.

[2] We assume a coordinated network (such as TDMA) with a fixed and identical transmission rate for each node.

For Node L/2, by the time it receives the first packet in the forward flow, the backward flow may not have reached the node yet. Thus the node may not be able to perform XOR-and-broadcast but may simply forward the packet. However, the second packet from the forward flow and the first packet from the backward flow may meet at Node L/2. Then an XOR-and-broadcast operation can be performed to save one channel use. Similarly, the last packet transmitted by Node L/2 may not be a broadcast because the forward flow is one packet ahead of the backward flow. Finally, the total channel uses saved at is n·M−2. By symmetry, Node L/2+2 may also have to forward the first and last packets without XOR coding, and broadcast the rest of the n·M−2 XOR coded packets.

Based on the above analysis, the number of broadcasts by all nodes can be calculated Node $\frac{L}{2}+1 \to n \cdot M$ broadcasts;

Node $\left\{\frac{L}{2}, \frac{L}{2}+2\right\} \to n \cdot M - 2$ broadcasts;

...

Node $\{2, L\} \to n \cdot M - 2 \cdot \left(\frac{L}{2}-1\right)$ broadcasts;

Node $\{1, L+1\} \to 0$ broadcasts.

The total channel uses saved may be the sum of broadcast times $$N_{saved} = n \cdot M \cdot \left(2 \cdot \left(\frac{L}{2}-1\right)+1\right) -$$
$$2 \cdot \left(1 + \ldots + \frac{L}{2}-1\right)$$
$$= n \cdot M \cdot (L-1) - \frac{L^2-2L}{4}.$$

The total channel uses without XOR coding may be 2n·M·L, and so the two-way gain of FUN-1 may be $$\text{Gain}_{even\ L}^{FUN-1} = \frac{2n \cdot M \cdot L}{2n \cdot M \cdot L - N_{saved}} \quad (9)$$
$$= \frac{2n \cdot M \cdot L}{n \cdot M \cdot (L+1) + \frac{L^2-2L}{4}} \overset{n \gg L}{\approx} \frac{2L}{L+1},$$

where the approximation may apply to large file size.

The odd L case: using the same analysis, the number of broadcasts by all nodes can be calculated Node $\left\{\frac{L+1}{2}, \frac{L+3}{2}\right\} \to n \cdot M - 2$ broadcasts;

...

Node $\{2, L\} \to n \cdot M - 2 \cdot \left(\frac{L-1}{2}\right)$ broadcasts;

Node $\{1, L+1\} \to 0$ broadcasts.

Following the same steps, the two-way gain of FUN-1 can be obtained below $$\text{Gain}_{odd\ L}^{FUN-1} = \frac{2n \cdot M \cdot L}{n \cdot M \cdot (L+1) + \frac{L^2-1}{4}} \overset{n \gg L}{\approx} \frac{2L}{L+1}. \quad (10)$$

FUN-2 Analysis

From the theoretical perspective, FUN-2 may be seen as different from FUN-1 in that the packets from two flows may only be combined once at one relay node, instead of many relay nodes. This may result in a lower two-way gain. The essence can be considered trading throughput for decoding complexity, because now relay nodes may not be required to decode. Under the current FUN-2 protocol [1], the combining may be performed upon the node where two flows joins. If both end nodes want to transmit n batches, the number of saved channel uses can be n·M. The two-way gain of FUN-2 may thus be $$\text{Gain}_L^{FUN-2} = \frac{2n \cdot M \cdot L}{2n \cdot M \cdot L - n \cdot M} = \frac{2L}{2L-1}. \quad (11)$$

Achievable Throughput Analysis

The above results may be obtained without considering the practical issues discussed above that may degrade the performance, which means they may only serve as upper bounds. In the following, these practical issues may be addressed, with the aim of obtaining more useful throughput results in terms of characterizing the actual performances of FUN-1 and FUN-2.

Similar to fountain codes, a good degree distribution design may be crucial to the performance of FUN codes. Batches generated from the optimal degree distribution can be decoded by a belief propagation (BP) algorithm with only linear complexity and very low coding overhead. However, a non-optimal degree distribution may require the decoder to collect K''>>K packets for a file recovery. A direct consequence may be that the achievable throughput may be lower than the theoretical capacity derived in (8) to (11).

In order to recover η·K native packets with linear complexity, the optimal degree distribution Ψ* may be obtained by solving the following optimization problem [8]

$$\max_{\Psi} \quad \frac{K}{n} \quad (12)$$

$$\text{s.t.} \quad \Omega(x, h, \Psi) + \frac{K}{n}\ln(1-x) \geq 0, \quad 0 \leq x \leq \eta,$$

$$\sum_d \Psi(d) = 1, \quad \Psi(d) \geq 0, \forall d,$$

where n may be number of received batches required for decoding, h ≜ {$h_{r,L}$, r=0, ..., M} may be the rank distribution of transfer matrix (e.g., the rank distribution of a channel represented by the transfer matrix), Ψ may be the degree distribution to be optimized, and Ω (x, h, Ψ) may be defined in [8, Eq. (19)] and may be a linear function of both h and Ψ.

It may be numerically verified that n·M can be very close to K if the optimal degree distribution is used. The outer codes used by FUN may be almost capacity-achieving for this one-way unicast network. However, when a non-optimal degree distribution is used, the throughput degradation has not been characterized.

Figure 8:
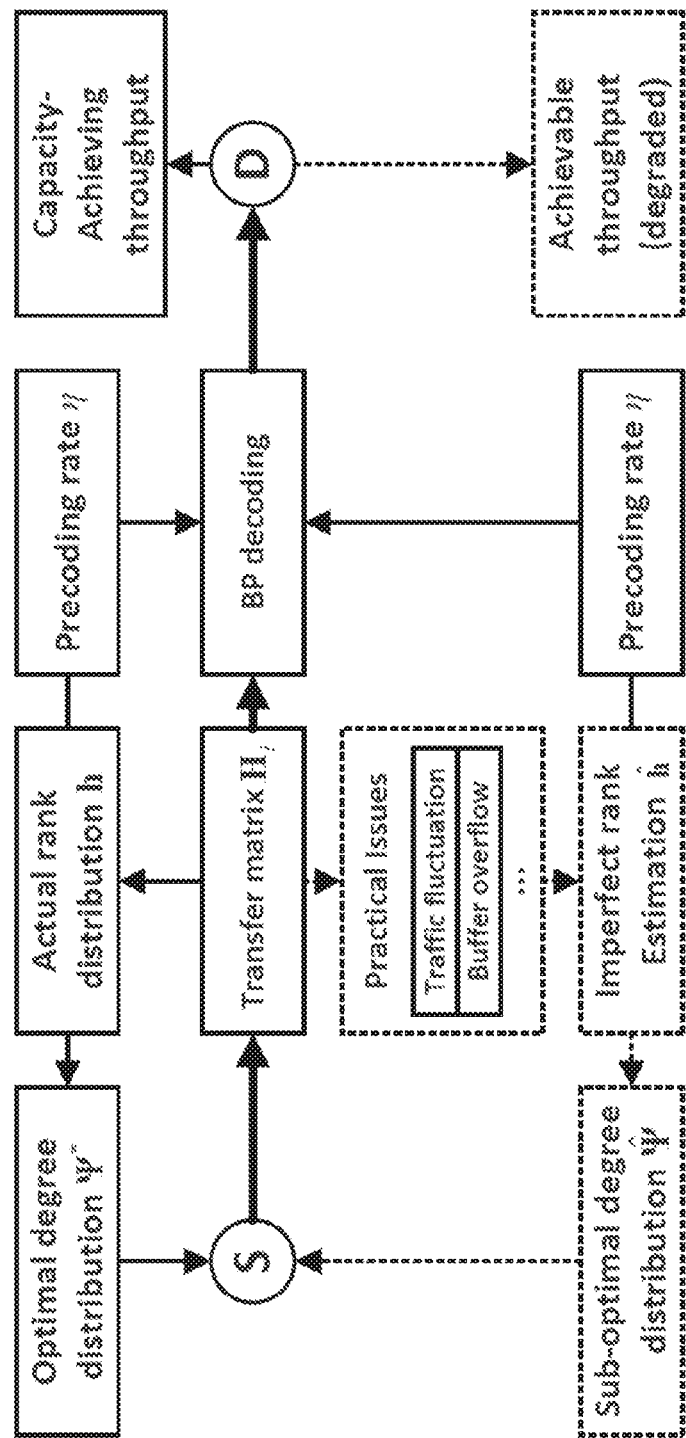
FIG. 8 is a diagram of an effect of an imperfectly estimated rank distribution on some embodiments.

1) Imperfect Rank Estimation: it can be seen from (12) that the optimal degree distribution may be affected by the transfer matrix $H_t$'s rank distribution h and the decoding ratio η. To fully recover a file, η is usually set to be the precoding rate. Thus the optimal degree distribution Ψ* is solely determined by the rank distribution h of the transfer matrix $H_t$. The above mentioned relationship is shown in the upper half of FIG. 8. FIG. 8 shows the effect of an imperfectly estimated rank distribution: a non-optimal degree distribution may be generated at the source node, which may result in a less efficient decoding process and degraded end-to-end throughput.

However, the optimality of FUN codes and the capacity-achieving capability may rely heavily on the accuracy of rank distribution estimation. There may not be a universally optimal degree distribution that works for all rank distributions. That implies that inaccurate rank estimation may introduce performance loss to a linear-complexity BP decoder.

For FUN codes, the transfer matrix $H_t$, which may govern its rank distribution h, may be the product of both the erasure matrices $E_{i,j}$, and the recoding matrices $H_{i,j}$ according to (4). In practice, the recoding matrices $H_{i,j}$ may be known, but the erasure matrices $E_{i,j}$ may need to be estimated in a practical system.

Due to the practical issues mentioned above, unexpected additional rank losses may easily occur due to traffic fluctuation and buffer overflow. This may make it very difficult to obtain a perfect rank estimation in practice. Provided with an imperfectly estimated rank distribution ĥ, only a sub-optimal degree distribution Ψ may be generated, and the achievable throughput of FUN codes may naturally degrade, as shown in the lower half of FIG. 8. This more meaningful achievable throughput (and the degradation from the theoretical upper bound) may be quantitatively evaluated.

2) Achievable Throughput Analysis: Assume that the actual rank distribution is h, but we only have an imperfect estimation ĥ. By numerically solving the optimization problem of (12), the optimal degree distribution Ψ* and sub-optimal degree distribution Ψ can be calculated using h and ĥ, respectively.

Denote by n* and n̂ the numbers of batches required to recover the original file under perfect and imperfect rank estimation, and their respective normalized one-way throughputs may be $$T_L^{FUN,\text{one-way}} \triangleq \begin{cases} T^* = \dfrac{K}{n^* \cdot M}, & \text{perfect rank estimation,} \\ \hat{T} = \dfrac{K}{\hat{n} \cdot M}, & \text{imperfect rank estimation} \end{cases} \quad (13)$$

A problem in this analysis may be determining n* and n̂. Using the sufficient and necessary conditions for successful decoding [8], it may be shown that n* and n̂ can be calculated from the optimal degree distribution Ψ* and sub-optimal degree distribution Ψ, respectively.

First, a condition function may be defined below $$f(n'\alpha, \eta, K, h, \Psi) \triangleq \quad (14)$$

$$\rho_0\left(\frac{\alpha \cdot \eta \cdot K}{n'}\right) = (1 - \alpha\eta)\left(\begin{array}{c} \sum_{r=1}^{M}\sum_{d=r+1}^{d_{max}} d\Psi_d\left(\sum_{i=r}^{M}\frac{\zeta_r^i h_i}{q^{i-r}}\right)I_{d-r,r}(\alpha\eta) + \\ \sum_{r=1}^{M}r\Psi_r\sum_{s=r}^{M}\left(\sum_{i=s}^{M}\frac{\zeta_s^i h_i}{q^{i-s}}\right) + \frac{K}{n'}\ln(1-\alpha\eta) \end{array}\right),$$

where n' may be the number of batches required for decoding, $$d_{max} \triangleq \max_d \{d : \Psi_d > 0\}$$

is the maximal degree with non-zero probability, $$I_{a,b}(x) \triangleq \sum_{j=a}^{a+b-1} \binom{a+b-1}{j} x^j (1-x)^{a+b-1-j}$$

is regularized incomplete beta function, and $\zeta_r^i$ is defined as follows $$\zeta_r^i \triangleq \begin{cases} (1-q^{-1})(1-q^{-i+1}) \cdots (1-q^{-i+r-1}), & r>0, \\ 1, & r=0 \end{cases}.$$

According to [8, Thm-1], to successfully recover the original file with high probability, the following condition may be sufficient $$f(n', \alpha, \eta, K, h, \Psi) > 0, \forall \alpha \in [0,1]. \quad (15)$$

Then, under perfect and imperfect rank estimation respectively, receiving the following numbers of batches may be sufficient for recovering the original file with high probability:

$$n^* = \min_{n' \in N} \{n' : f(n', \alpha, \eta, K, h, \Psi^*) > 0, \forall \alpha \in [0,1]\}, \quad (16)$$

$$\hat{n} = \min_{n' \in N} \{n' : f(n', \alpha, \eta, K, h, \hat{\Psi}) > 0, \forall \alpha \in [0,1]\}. \quad (17)$$

By plugging (16) and (17) into (13), respectively, the achievable one-way throughput under perfect and imperfect rank estimation can be obtained. Note that although different degree distributions $\Psi^*$ and $\hat{\Psi}$ may be used, the same transfer matrix h may be used in both (16) and (17).

Finally, the achievable two-way throughputs (the sum throughput of both forward and backward flows) of FUN-1 and FUN-2 can be obtained by combining (13) with (10) and (11), respectively $$T_L^{FUN-1} = \frac{2L}{L+1} T_L^{FUN,one-way}, \quad (18)$$

$$T_L^{FUN-2} = \frac{2L}{2L-1} T_L^{FUN,one-way}. \quad (19)$$

3) Numerical Results: To better appreciate the above theoretical results, the achievable throughput of FUN codes derived from (18) and (19) may be numerically examined.

Figure 9:
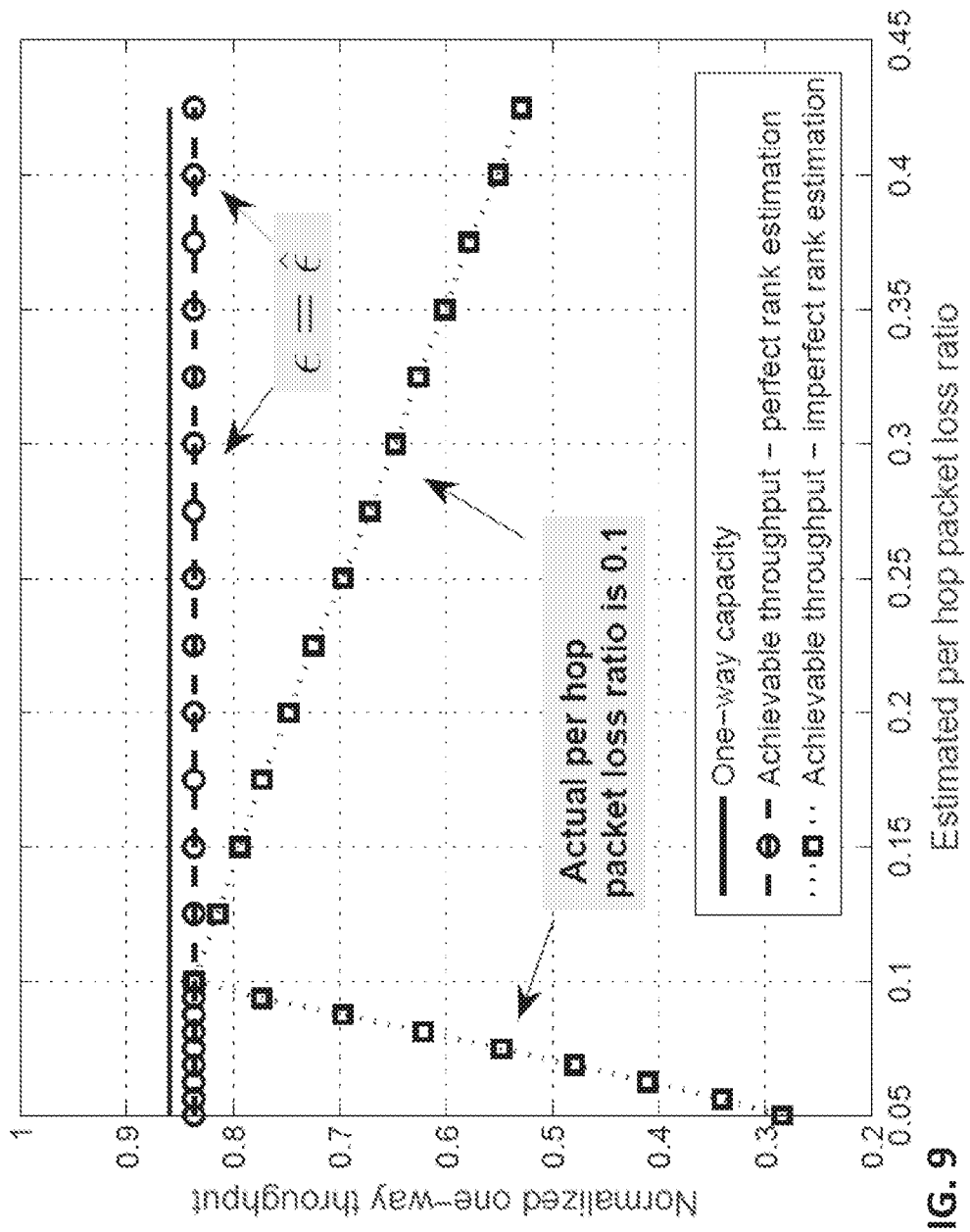
FIG. 9 is an additional diagram of an effect of an imperfectly estimated rank distribution on some embodiments.

In FIG. 9, the throughput degradation from imperfect rank estimation may be quantitatively analyzed. For convenience, all throughputs may be normalized to the capacity of a single hop network without any packet loss.

We examine a two-hop ad-hoc network, where the actual per hop packet loss ratios may be $\{\epsilon_1, \epsilon_2\}$. Due to imperfect estimation, the estimated rank distribution $\hat{h}$ may be measured from $\{\hat{\epsilon}_1, \hat{\epsilon}_2\}$. Then, the degree distributions may be optimized according to actual rank distribution h and estimated rank distribution $\hat{h}$. Finally, the achievable one-way throughputs can be calculated from (16) and (17), respectively.

Figure 10:
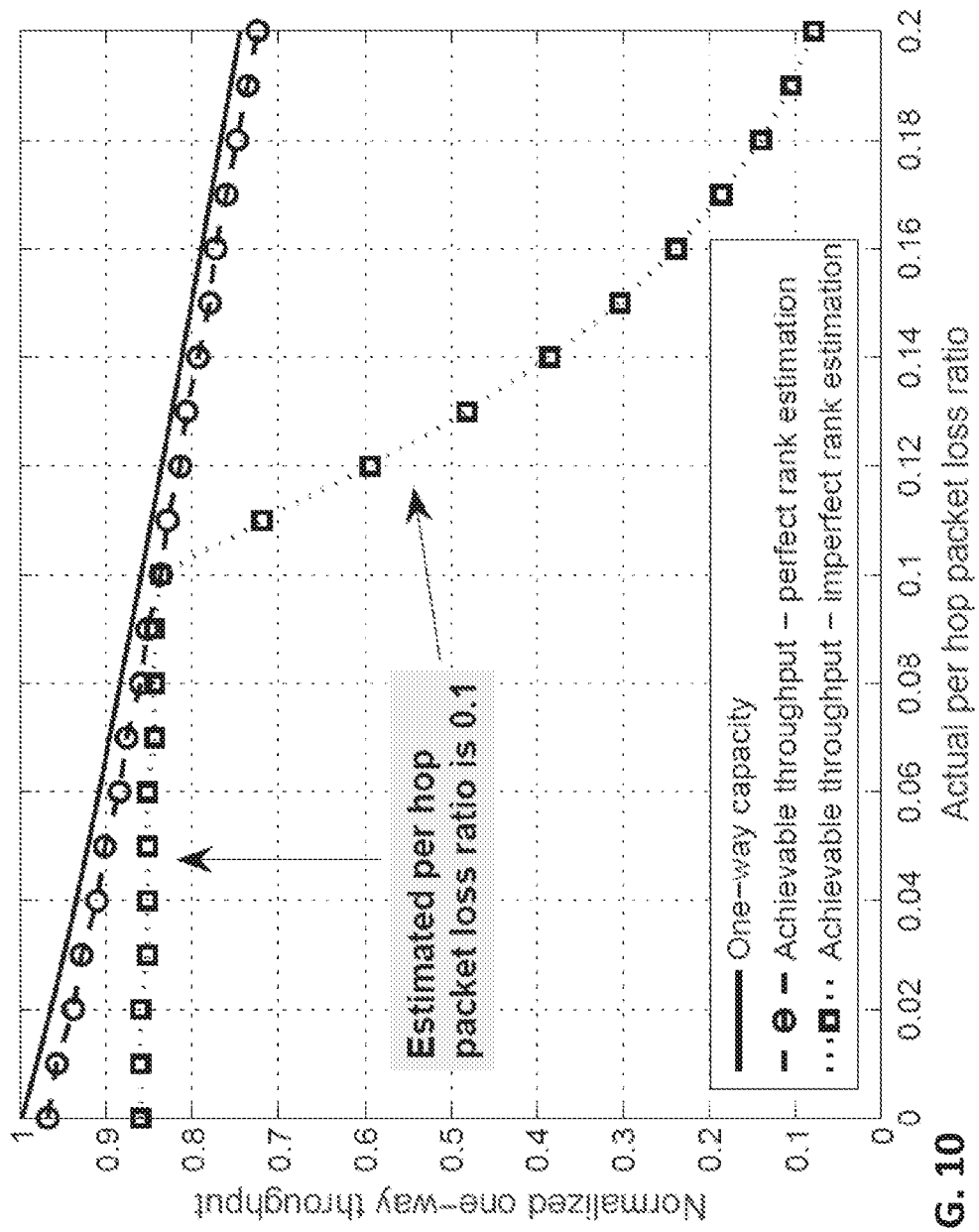
FIG. 10 is another diagram of an effect of an imperfectly estimated rank distribution on some embodiments.

As shown in FIGS. 9 and 10, the solid curve (FIG. 9) is the one-way capacity calculated from (8). The two curves below denote the achievable one-way throughputs. The dashed curve (middle) is the achievable throughput using optimal degree distribution $\Psi^*$, i.e., when the estimated rank distribution is accurate. The dotted curve (FIG. 10) is the achievable throughput using non-optimal degree distribution $\Psi$, i.e., when the estimated rank distribution is different from the actual rank distribution.

In both FIG. 9 and FIG. 10, the throughput may be capacity-achieving only when the estimated rank distribution equals the actual rank distribution. However, in most scenarios where only imperfect rank distribution is available, the throughput degradation can be significant. Therefore, it may be confirmed that an accurate rank estimation may be important for reaching the maximum gain of FUN codes. Nevertheless, it may also be observed from FIG. 9 that the achievable throughput degrades less severely when the estimated packet loss ratio is higher than the actual value. The insight is "it is better to be pessimistic than optimistic", which means: when only coarse estimation is available, we it may be better to assume a higher packet loss ratio instead of a lower packet loss ratio.

In fact, the right half of FIG. 10 simulates the scenario described in FIG. 7, where the actual packet loss ratio may increase ($\epsilon > 0.1$) due to buffer overflow or rising congestion level. However, the source may not detect this increase and still uses the previous rank estimation corresponding to $\hat{\epsilon} = 0.1$. The resulting throughput degradation may be tremendous, as indicated by FIG. 10.

FIG. 9 shows a fixed actual rank distribution estimation (measured from $\epsilon_1 = \epsilon_2 = 0.1$), but an adjusted estimated rank distribution (measured by gradually increasing $\hat{\epsilon}_1$ and 1 and $\hat{\epsilon}_2$ from 0 to 0.2). FIG. 10 shows a fixed estimated rank distribution estimation (measured from $\hat{\epsilon}_1 = \hat{\epsilon}_2 = 0.1$), but a gradually increased actual $\epsilon_1$, $\epsilon_2$ from 0 to 0.2. The achievable throughput may be optimal only when rank estimation is accurate ($\hat{\epsilon}_1 = \epsilon_1$, $\hat{\epsilon}_2 = \epsilon_2$).

Figure 11:
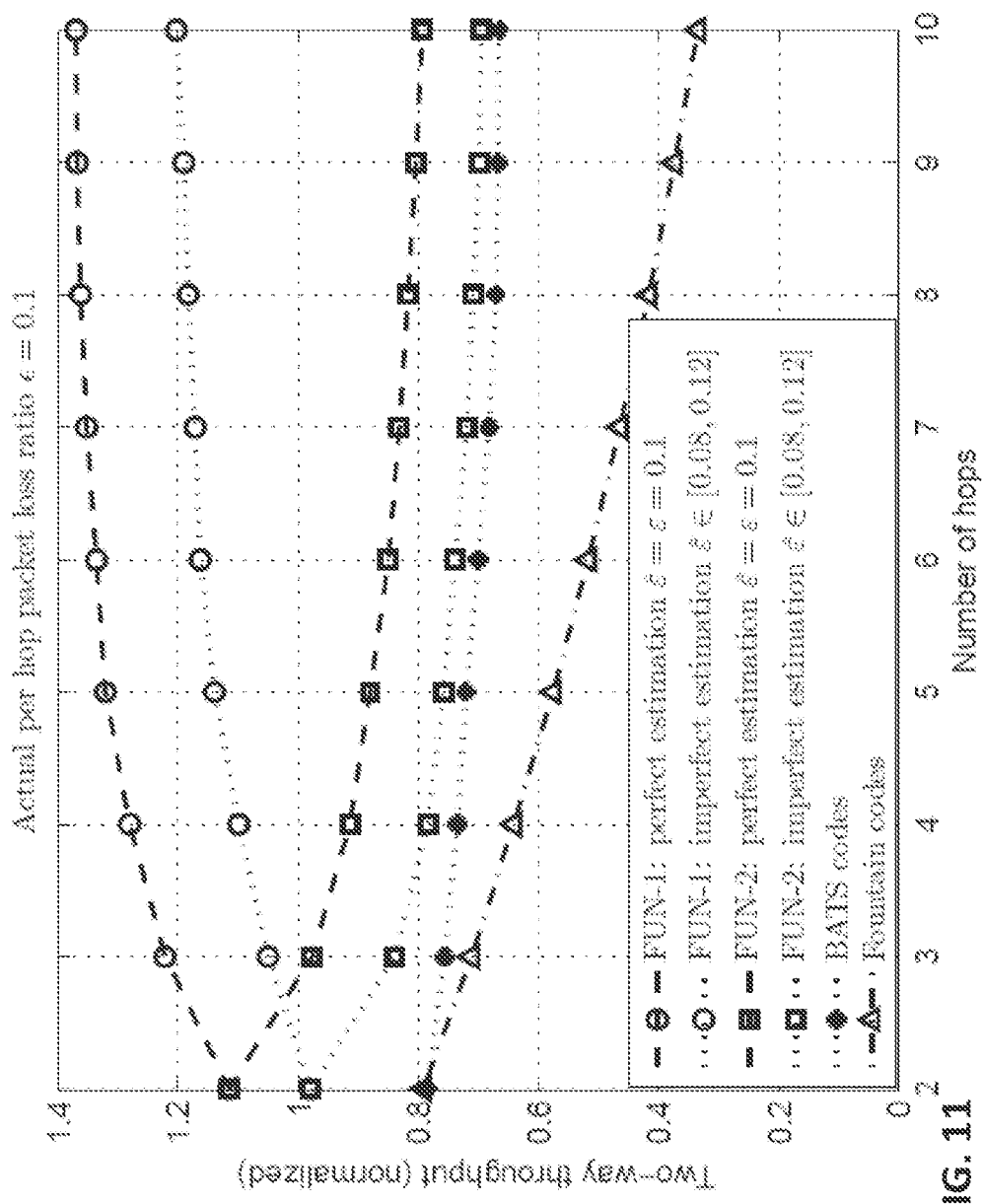
FIG. 11 is a chart showing achievable throughput of various schemes in a multi-hop ad-hoc network according to some embodiments.

FIG. 11 shows achievable throughput of various schemes in a multi-hop ad-hoc network. In FIG. 11, the effect of network length on achievable throughput may be studied. Specifically, the ad-hoc network may be extended from two hops to ten hops, and the two-way throughput may be numerically examined. All ten links may be homogeneous with a packet loss ratio $\epsilon = 0.1$. As shown in FIG. 11, the uppermost four curves are the throughputs of FUN-1 and FUN-2. Among them, the two curves that grow with the number of hops are for FUN-1, and the other two curves that decrease with the number of hops are for FUN-2. In the two curves for FUN-1, the upper one is for the case of perfect rank estimation, and the lower one, is for the case of imperfect rank estimation $\hat{h}$. Specifically, $\hat{h}$ may be measured from an estimated per hop packet loss ratio $\hat{\epsilon}$ uniformly chosen from [0.08, 0.12] (i.e., within 20% estimation error). The two curves for FUN-2 are obtained, similar to those for FUN-1.

The bottommost two curves are the throughputs of BATS codes and fountain codes in a two-way communication scenario. The following two observations may be made:

FUN-1 may be best among all schemes, followed by FUN-2, BATS, and fountain codes. The throughput gain of FUN codes over BATS and fountain codes may be from combining the two flows.

As the number of hops increases, FUN-1's throughput may increase because more relay nodes engage in XOR. coding and thus the two-way gain may increase. For FUN-2, since only one relay node may engage in the two-way RLNC recoding, the throughput may decrease with the number of hops. The throughput of fountain code may drop more quickly than any other schemes because it may not have the recoding capability at relay nodes.

If only imperfect rank estimation is available, e.g., 20% estimation error on per hop packet loss ratio, the throughput performances of both FUN-1 and FUN-2 may drop significantly, but are still better than the other schemes.

Complexity Analysis

The complexity of FUN coding at different nodes is listed in Table I. At the source node, the coding complexity for both FUN-1 and FUN-2 may result from precoding and outer coding. Precoding a file consisting of K native packets may require $\eta K \cdot d$ operations, where $\eta K$ may be the number of parity packets and d may be the density of the code. The per packet complexity $\mathcal{O}(\eta d)$ may be very small if LDPC code is used. The outer code complexity of FUN codes may be $\mathcal{O}(M)$. At the relay nodes, the operations may be different for FUN-1 and FUN-2. The three operations performed in FUN-1 may be inner coding, XOR encoding, and XOR decoding. The inner coding of FUN-1 may require M×M multiplications for each batch, and therefore the complexity may be $\mathcal{O}(M)$ per packet. Both XOR encoding and decoding may require M XOR operations for each batch and thus may only incur $\mathcal{O}(1)$ complexity per packet. For FUN-2, all relay nodes may have the same inner code complexity as FUN-1 except the relay node where two flows may meet. This particular relay node may mix two batches by multiplying them with a 2M×M-sized transfer matrix, resulting in doubled complexity of $\mathcal{O}(2M)$ per packet but still may have the same order. At the destination node, the BP decoding complexity of FUN-1 may be $\mathcal{O}(M^2+MT)$, where T may be packet length. For FUN-2, there may be an additional procedure to subtract the backward flow component before performing BP decoding. The additional complexity is mainly the M×M multiplications required to compute the backward flow component. Therefore, the total complexity may be $\mathcal{O}(M^2+MT+M)$ per packet, which may be equivalent to $\mathcal{O}(M^2+MT)$ in the order sense.

TABLE I

FUN CODING COMPLEXITY PER PACKET

| Node | FUN-1/2 | | FUN-1 | FUN-2 | FUN-1: XOR | |
|---|---|---|---|---|---|---|
| | Precode | Outer | Inner code | | Enc. | Dec. |
| Source | $\mathcal{O}(\eta d)$ | $\mathcal{O}(M)$ | / | / | / | / |
| Relay | / | / | $\mathcal{O}(M)$ | $\mathcal{O}(M)$ | $\mathcal{O}(1)$ | $\mathcal{O}(1)$ |
| Dest. | | | FUN-1/2: Decode $\mathcal{O}(M^2 + MT)$ | | | |

As seen, the complexity of FUN codes may not grow with the file size K and may mainly be determined by the value of M. In practice, a small M (e.g., M=1.6) may be sufficient to yield significant throughput gain over fountain codes. The relatively low complexity of FUN codes may provide the much desired implementation scalability: e.g., large-sized file spreading over large-scale networks.

A System Design of FUN Codes

Based on the above theoretical observations, the inventors have recognized and appreciated that accurately tracking the rank distribution of the end-to-end transfer matrix may be pivotal to achieving the maximal gain of FUN codes. However, how to estimate this rank distribution in practice is not addressed in previous works [1]. In order to get the best out of FUN codes, the following three issues should be considered: (i) accurately estimate the rank distribution, (ii) stabilize the actual rank distribution, and (iii) provide robustness against estimation errors.

Packet Structure of FUN

Both FUN-1 packet and FUN-2 packet may have two headers as shown in FIG. 12A. If a re-coded packet is mixed from two flows (i.e., forward and backward flows), it will have a non-empty Header 2; otherwise, there will be no Header 2.

Header 1 and Header 2 may have the same structure for FUN-1 and FUN-2. FIG. 12B shows the structure for FUN-1 Header 1 and Header 2. FIG. 12C shows the structure for FUN-2 Header 1 and Header 2. In FIGS. 12B and 12C, the NC switch consists of two bits and indicates one of the following four schemes is used: 1) FUN-1, 2) FUN-2, 3) RLNC, 4) no network coding. COPE is a special case of FUN-1, where there is no encoding vector in FUN Headers; in other words, if the NC switch equals 00 (in binary format) and there is no encoding vector in FUN Headers, then the packet is a COPE packet. BATS may be considered a "special case" of FUN-2, where there is no FUN Header 2. The fountain code corresponds to the no-network-coding case with the NC switch equal to 11 (in binary format) and no encoding vectors in FUN header and no Header 2.

In some embodiments, the FUN architecture may be extensible to accommodate more than two flows and more than two FUN headers.

Rank Distribution Estimation

In the theoretical analysis, the rank distribution of $H_i$ may be calculated from two parameters: (i) number of hops and (ii) the packet loss ratio of each hop. However, it may be difficult to do so in practice due to the very limited feedback allowed. In a realistic ad-hoc network, the coded packets may travel through multiple paths between source and destination, making such per-hop parameter estimation even more infeasible.

Therefore, an end-to-end rank estimation of transfer matrix may be used, which may only require a very small amount of feedback. First, the rank statistics of the received batches may be measured at the destination node. Specifically, upon receiving the i-th batch, its degree $d_i$ may be checked, which may be known to the decoder. If $d_i \geq M$, the batch may be full rank when it was transmitted by the source node. Thus, the rank of this received batch may equal the rank of the transfer matrix it went through, and this information can help estimate the rank distribution of the transfer matrix. If $d_i \leq M$, the statistics may not be collected.

Figure 13:
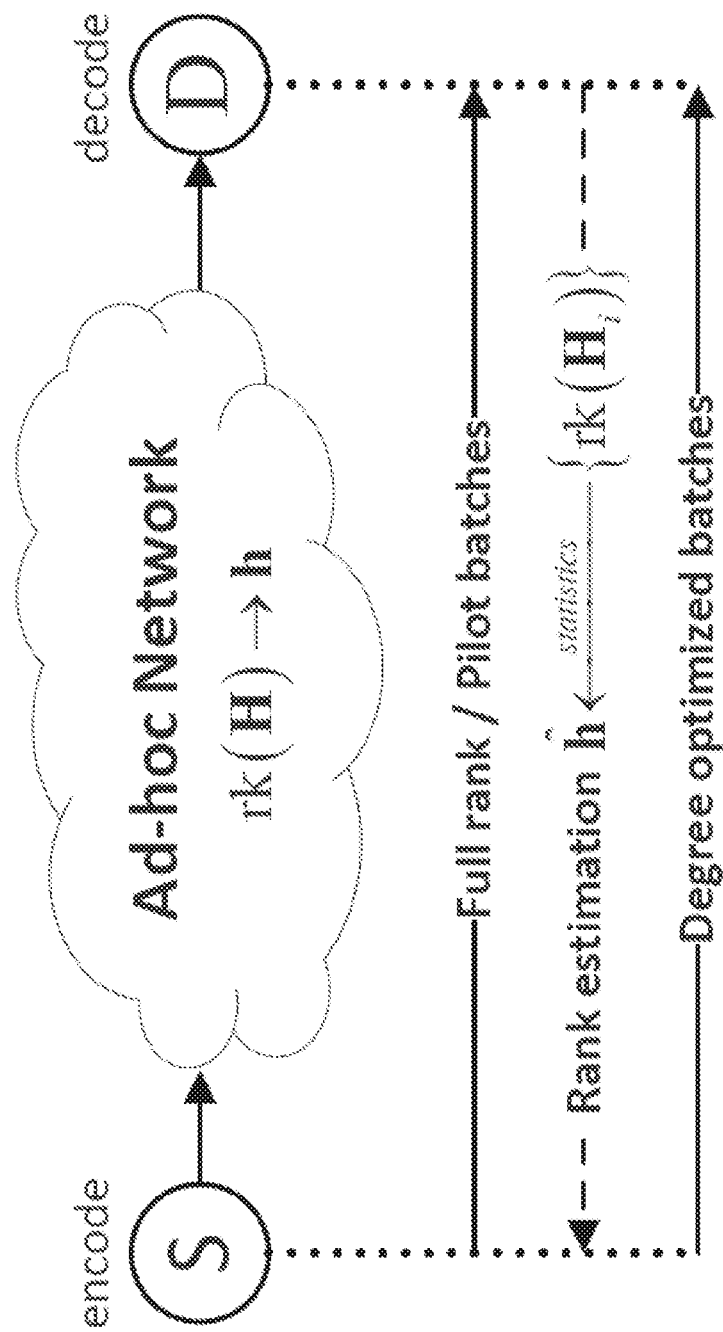
FIG. 13 is a diagram of rank distribution estimation in an ad-hoc network according to some embodiments.

FIG. 13 shows rank distribution estimation in an ad-hoc network: the rank of the end-to-end transfer matrix can be measured through the ranks of received batches. As shown in FIG. 13, after receiving sufficient batches, the destination node can generate a histogram from the ranks of received batches, which may approximate the actual rank estimation of the end-to-end transfer matrix. The estimated rank distribution may then be returned to the source node using a single M-sized feedback. To ensure a reliable delivery of this important information, end-to-end acknowledgement (e.g., in TCP) may be used. The benefit of this rank estimation method may be two-fold. First, the actual path each packet went through and the packet loss ratio of every hop may not need to be known. Second, the feedback amount $\Theta(M)$ may be negligible compared to the file size $\Theta(K)$.

A natural question may be: what if, in the beginning of a file transfer, there is no history information about the rank distribution. In this case, the source may not be able to get an optimal degree distribution $\Psi^*$ beforehand. Alternatively, the source node may transmit a certain number of full-rank batches as "pilot batches", and may allow a "warm-up" time to retrieve a rank estimation from the destination. Note that, different from the pilot signal in wireless communications that is considered as pure overhead because it does not carry any data, the pilot batches here may also provide information about the source file in some embodiments. The pilot batches may be generated from arbitrary degree distribution as long as they satisfy the full-rank property. The purpose may be to obtain a rank distribution estimation using these pilot batches. Once it is done, the source node can use the optimal degree distribution to encode the following batches, and the destination node may use both the pilot batches and degree optimized batches to decode.

Batch-Wise Buffer Insertion

Being able to estimate the rank distribution alone may not guarantee an accurate tracking of the end-to-end transfer matrix. As discussed above, unpredictable traffic congestions in even parts of the network may cause significant fluctuations in the end-to-end rank distribution, which may inevitably compromise the accuracy of rank estimation. Even if the initially estimated rank distribution is accurate, such fluctuations may make the actual rank distribution deviate from the estimation, which may lead to throughput degradation.

Figure 14:
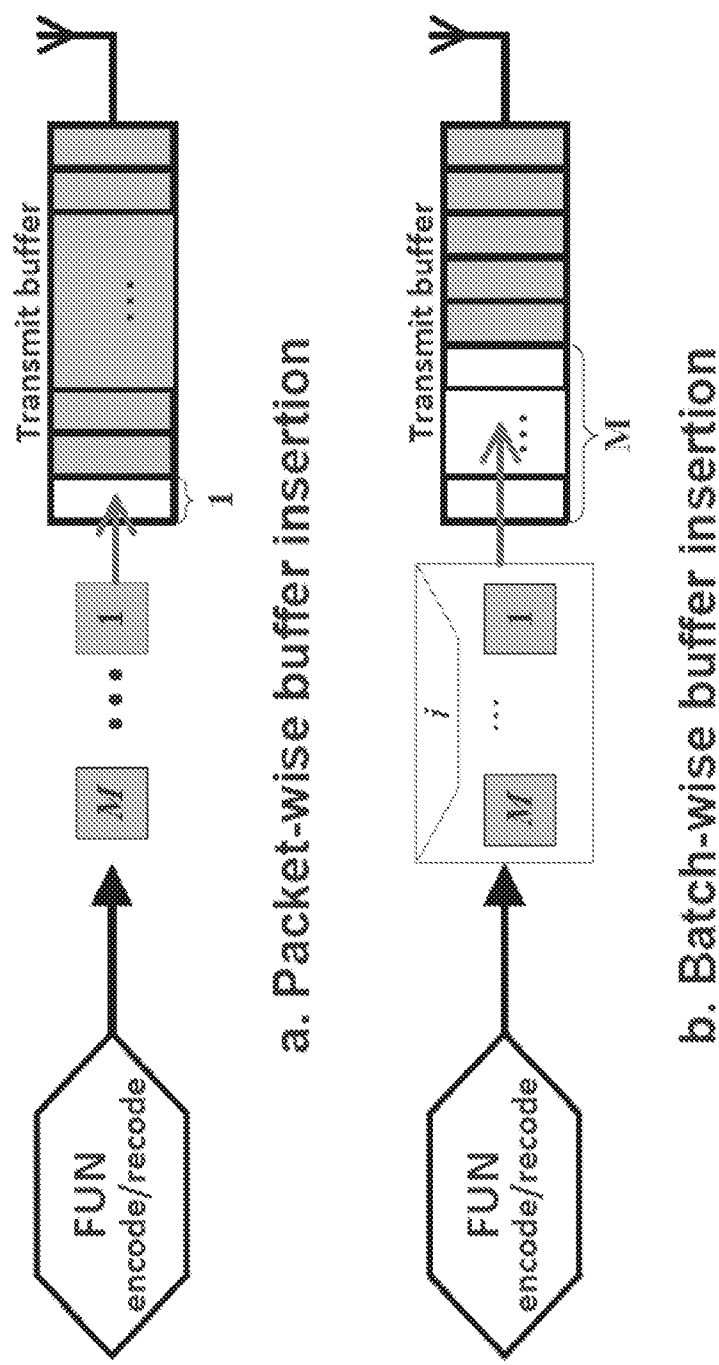
FIG. 14 is a diagram of a comparison between two buffer insertion schemes according to some embodiments.

FIG. 14 shows a comparison between two buffer insertion schemes: packet-wise buffer insertion may feed the buffer whenever there is room for a single packet, while batch-wise buffer insertion may hold the encoded/recoded batch until the buffer can accommodate M packets. As illustrated in FIG. 14(a), the conventional packet-wise buffer insertion scheme may feed the buffer whenever there is room for a single packet. In the case of congestion, the packet arrival rate may be much higher than the service rate, and thus the packet loss ratio contributed by buffer overflow may become high. Assume that only one packet in the i-th batch is inserted into the transmit buffer and then received by the next-hop node; this "survived" packet will be recoded into a batch of M identical packets. However, the rank of this batch may still be one. The drawbacks may be two-fold. On the one hand, this type of low-rank batches may flood the downstream links with too much redundancy. On the other hand, the end-to-end rank distribution may deviate too much from the initial estimation.

Figure 15:
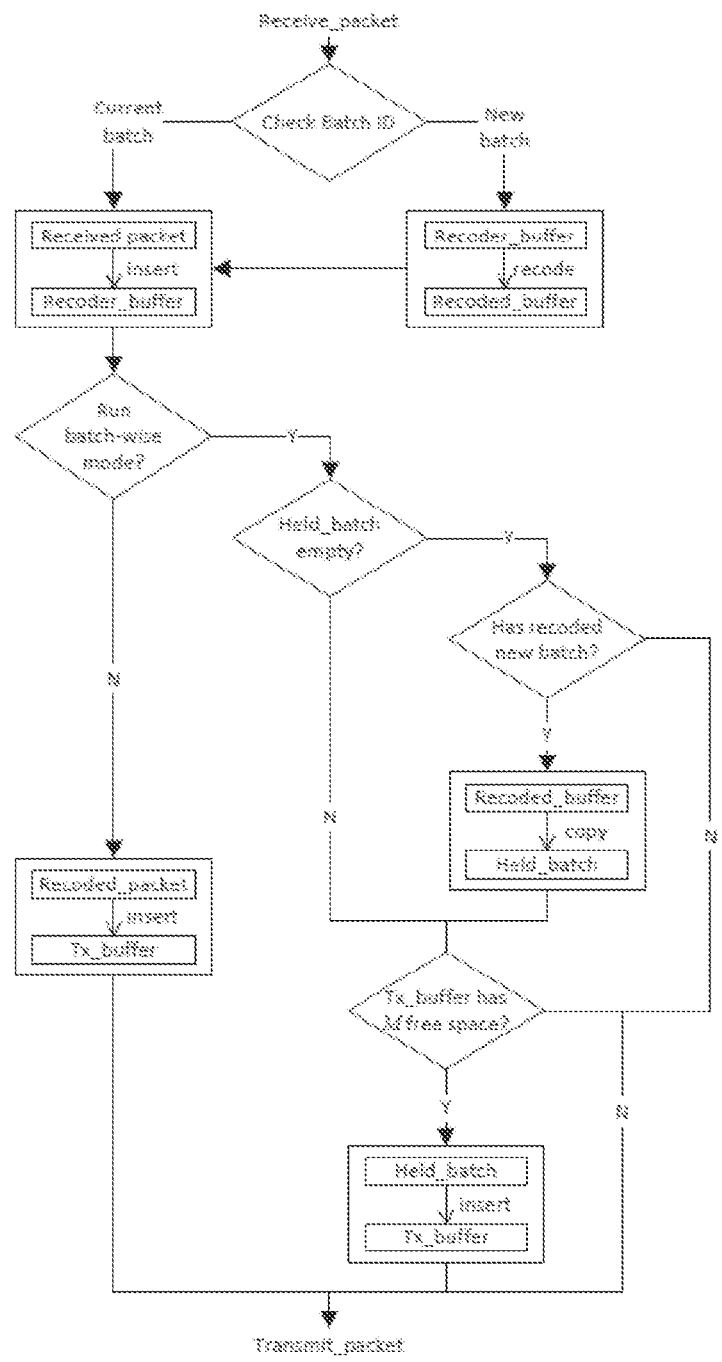
FIG. 15 is a flowchart of an exemplary method of batch-wise buffer insertion according to some embodiments.

To address this problem, a batch-wise buffer insertion scheme may be implemented (see FIG. 15, which shows a flowchart of batch-wise buffer insertion at a relay node) that can eliminate the effect of buffer overflow on end-to-end transfer matrices, so as to maximally stabilize the actual rank distribution. In contrast to packet-wise operation, the batch-wise buffer insertion scheme holds an entire encoded/recoded batch until the buffer can accommodate all M packets (see FIG. 14(b)). During this time, additional incoming encoded/recoded batches may be discarded until the currently held batch is inserted into the buffer. The inventors have recognized and appreciated that the batch-wise buffer insertion scheme may maximally preserve the structure of a batch. From the destination's perspective, every received batch may be free from buffer overflow packet loss, because the packets in the same batch are may be either discarded altogether or put into the transmit buffer intact. Note that if an entire batch is lost, it may not contaminate the perceived rank distribution at the destination node.

A comparison between the batch-wise buffer insertion scheme and the conventional packet-wise buffer insertion scheme is illustrated in FIG. 14. Assume that, in the same network condition where the number of packets received by the destination node is the same for the two schemes, the packet-wise buffer insertion scheme mostly yields low-rank batches while the received batches under the batch-wise buffer insertion scheme have higher rank. Therefore, the perceived rank distribution under our scheme may be closer to the initial estimation. As discussed above, extra throughput degradation from buffer overflow may be avoided.

Safety Margin

Although the estimated end-to-end rank distribution may be immune from the effect of congestion-related buffer overflow according to some embodiments, it may still fluctuate with dynamic wireless channel condition. Therefore, the inventors have recognized and appreciated the need to protect robustly against reasonable estimation error. When the estimated rank distribution is different from the actual distribution, FIGS. 9 and 10 show that the throughput may degrade more severely when the estimated packet loss ratio is lower than the actual value. The inventors have recognized and appreciated that it is always better to be pessimistic than optimistic about the packet delivery ratio.

In practice, the per-hop packet loss ratio may not be known, but the end-to-end rank distribution may be directly estimated. Since a higher packet loss ratio may correspond to a lower-ranked transfer matrix, we may use a "pessimistic" rank distribution $\check{h}$ with a reduced average rank to achieve robustness against estimation errors. The rank reduction can be controlled by a parameter $\theta$: $\mu_{\check{h}} = (1-\theta)\mu_{\hat{h}}$, where $\mu_{\check{h}}$ and $\mu_{\hat{h}}$ are the average rank of $\check{h}$ and $\hat{h}$, respectively.

We call $\theta$ the "safety margin" because the throughput may not degrade too much as long as the estimation error falls within this "safety margin". The following flowchart illustrates the relationships among h, $\hat{h}$ and $\check{h}$:

$$h \triangleq (h_0, \ldots, h_M) \xrightarrow{estimate} \hat{h} \xrightarrow{safety\ margin\ \theta} \check{h}.$$

For a single path L-hop file transfer, the end-to-end rank reduction of a batch may correspond to the sum of rank losses in each hop. Since the packet losses over different hops may be independent[3], the end-to-end rank reduction may roughly follow Gaussian distribution when L is large. Thus, a continuous approximation of $\hat{h}$ can be parameterized by $N(\mu_{\hat{h}}, \sigma_{\hat{h}}^2)$, where $\mu_{\hat{h}}$ and $\sigma_{\hat{h}}^2$ may be the mean and variance of the received ranks. After applying the safety margin, the estimated rank distribution $\check{h}$ can be obtained by discretizing the reduced rank Gaussian distribution:

$$(\hat{h}, \theta) \to \check{h}: N((1-\theta)\mu_{\hat{h}}, \sigma_{\hat{h}}^2) \xrightarrow{discretize} \check{h}.$$

When there are multiple paths, the destination node can follow the above procedures to process the rank distributions of all paths, and then integrate them into a single rank distribution using weighted sum.

[3] Recoding may introduce weak correlation between adjacent hops.

Examples Based on Simulation: FUN Codes in TDMA Networks

The performance of FUN codes may be examined in a TDMA multi-hop network[4], in which all nodes may be deployed along a straight line with equal spacing set as their transmission range. The time slots assigned to neighboring nodes may be non-overlapping so that inter-user

[4] We use TDMA because retransmission can be naturally turned off, and there are less out-of-control factors from the MAC layer. For experimental results under IEEE 802.11b, please refer to [1]. interference is negligible. The transmit buffer length may be 50 packets for all relay nodes. In this scenario, packet losses may be mainly caused by channel error and buffer overflow. The average packet loss ratio caused by channel error may be set to be 10% if not otherwise specified. The service rate of each node can be controlled by the number of time slots assigned to it. When the traffic load is low, each source/relay node may transmit/broadcast at a fixed 1 Mbps rate. If congestion occurs in part of the network, however, the local service rate may be lower than 1 Mbps, causing buffer overflow to the affected nodes.

The throughput performances of FUN codes may be compared with BATS codes, fountain codes, and RLNC. In all experiments, two end nodes simultaneously start to transmit a 16 MByte file (16000 native packets) to each other. The file throughput (in Mbps) of a single flow is calculated by dividing the file size by the transmission time. The transmission time is measured from the start of file transmission until all native packets are correctly recovered. A performance metric is two-way throughput, which is calculated as the sum throughput of the forward flow and the backward flow. In each scenario, twenty files are transmitted and the average value recorded.

The following schemes are used in experiments to test FUN codes:

FUN codes

Scheme 1: Without Rank Estimation.

The source node may have no knowledge about the rank distribution. Therefore a fixed degree distribution, i.e., all batches with degree M=16, is used.

Scheme 2: Rank Estimation+Packet-Wise Buffer Insertion.

The destination node may collect rank statistics from a certain number of previously received batches (e.g., 50 pilot batches unless otherwise specified), and may estimate the rank distribution discussed above. The estimation is returned to the source node to generate a sub-optimal degree distribution. The relay nodes may perform packet-wise buffer insertion as discussed above.

Scheme 3: Rank Estimation+Batch-Wise Buffer Insertion.

The rank estimation part may be the same as Scheme 2, but the relay nodes may perform batch-wise buffer insertion as discussed above.

Scheme 4: Rank Estimation+Batch-Wise Buffer Insertion+Safety Margin.

After collecting the rank statistics, the destination node may apply a safety margin to the estimated rank distribution as discussed above, and may return this processed rank distribution to the source node. The relay nodes may perform batch-wise buffer insertion.

Analysis: Perfect Rank Estimation.

This analytical throughput may be calculated by assuming perfect rank estimation at the source nodes. The optimal throughput in this ideal case may be calculated from (18) and (19).

BATS codes: we implement BATS codes according to BATSpro-1 in [9].

Fountain codes: specifically, the Raptor-Q code described in [25] is used.

Random linear network coding (RLNC) [10]: a file is segmented into batches, each of which consists of M native packets. Each batch is transmitted independently as if it is a single file; the RLNC coding is performed within a batch and there is no coding across two batches. End-to-end ACK is used to guarantee the reception of each batch.

Comparison of Different Schemes

1) Two-hop network: The setup of this set of experiments is the following. The three nodes of interest in the network are: a source node, a destination node, and one relay node. The communication path from the source node to the destination node has two hops. At first, both hops have a service rate at 1 Mbps and a packet loss ratio of 10%. Then, due to congestion with outside users, the service rate of the second hop drops from 1 Mbps to 0.9 Mbps after re-allocation of time slots.

TABLE II

A COMPARISON OF DIFFERENT SCHEMES: TWO-HOP NETWORK

| Throughput (Mbps) | | Before congestion | After congestion |
|---|---|---|---|
| FUN-1 | Scheme 1 | 0.4818 | 0.4620 |
| | Scheme 2 | 1.0087 | 0.4243 |
| | Scheme 3 | 1.0395 | 0.9044 |
| | Scheme 4 | 1.0630 | 0.9788 |
| | Analysis | 1.1327 | 1.0308 |
| FUN-2 | Scheme 1 | 0.4750 | 0.4664 |
| | Scheme 2 | 1.0299 | 0.4072 |
| | Scheme 3 | 1.0388 | 0.9190 |
| | Scheme 4 | 1.0786 | 0.9727 |
| | Analysis | 1.1337 | 1.0308 |
| BATS | | 0.7741 | 0.3188 |
| Fountain | | 0.7713 | 0.6942 |
| RLNC | | 0.7340 | 0.6579 |

The throughput of FUN codes (Scheme 1-4), BATS codes, fountain codes, and RLNC is shown in Table II. The throughput is measured both before and after the aforementioned network fluctuation, in which the service rate of the second hop is reduced from 1 Mbps (before congestion) to 0.9 Mbps (after congestion), while the packet loss ratio caused by channel error remains the same ($\in=0.1$) for both hops. We have the following observations:

The two-way throughput of FUN codes may surpass 1 Mbps (service rate). Note that this may be impossible without the "piggyback" gain from combining the two flows. For a fair comparison, we also measure the two-way throughput under BATS, Fountain, and RLNC.

Our proposed design of FUN-1 and FUN-2 achieves higher throughput than BATS, fountain, and RLNC. Take FUN-1 for example, the throughput gains over BATS, fountain, and RLNC are 39%, 40% and 47%, respectively.

Within FUN codes, Scheme 4 has the highest performance. Comparisons among Scheme 1 to Scheme 4 show that: (i) rank estimation is essential to FUN codes, otherwise the throughput may degrade up to 55%; (ii) both batch-wise buffer insertion and safety margin can further improve the performance of FUN codes, with 3% and 6% gains over Scheme 1, respectively.

Batch-wise buffer insertion significantly enhances the robustness of FUN codes against network congestion. Without batch-wise buffer insertion, the throughput may drop 61% (Scheme 2) after congestion, while the throughput loss is only 14% with batch-wise buffer insertion (Scheme 3).

After the congestion, the throughput of BATS dramatically degrades, while fountain coding exhibits better robustness. This is because the initial degree distribution is no longer optimal after the change of end-to-end rank distribution.

TABLE III

A COMPARISON OF DIFFERENT
SCHEMES: FIVE-HOP NETWORK

|  | Throughput (Mbps) | Before congestion | After congestion |
|---|---|---|---|
| FUN-1 | Scheme 1 | 0.3467 | N/A |
|  | Scheme 2 | 1.0726 | 0.4405 |
|  | Scheme 3 | 1.2218 | 1.0314 |
|  | Scheme 4 | 1.2466 | 1.0969 |
|  | Analysis | 1.3218 | 1.1897 |
| FUN-2 | Scheme 1 | 0.2349 | N/A |
|  | Scheme 2 | 0.7204 | 0.2941 |
|  | Scheme 3 | 0.8114 | 0.7010 |
|  | Scheme 4 | 0.8415 | 0.7399 |
|  | Analysis | 0.8812 | 0.7931 |
| BATS |  | 0.6628 | 0.2721 |
| Fountain |  | 0.5621 | 0.5058 |
| RLNC |  | 0.4908 | 0.4361 |

The above results basically validate the analysis and design discussed above.

2) Five-hop network: The setup of this set of experiments is similar except that there are five hops and four relay nodes. At first, all hops have a service rate at 1 Mbps and a packet loss ratio of 10%. Similarly, the service rate of the third hop drops from 1 Mbps to 0.9 Mbps due to congestion with outside users. From the throughput results in Table III, we have the following observations:

Compared with the two-hop case, the throughput gain of FUN-1 over others is even larger in a five-hop network. Respectively, the gains are 89%, 123% and 155% over BATS, fountain, and RLNC. This is because more relay nodes engage in XOR coding, which yields higher coding gain. On the other hand, the gain of FUN-2 may be less significant because only one relay node may be allowed to combine the packets from two flows.

All other observations are the same as the two-hop case. Combining the results in Table II and Table III, we can conclude that Scheme 4 (rank estimation+batch-wise buffer insertion+safety margin) may be the best among all FUN coding schemes.

Effect of Congestion Level

In the previous experiments, we only simulated a fixed congestion level where the service rate of a particular hop drops from 1 Mbps to 0.9 Mbps. The inventors have recognized and appreciated that when more outside users share the same wireless channel, the drop of service rate for an individual user can be more significant. In this set of experiments, we simulate a wider range of congestion levels to examine its effect on throughput of a two-hop network.

Figure 16:
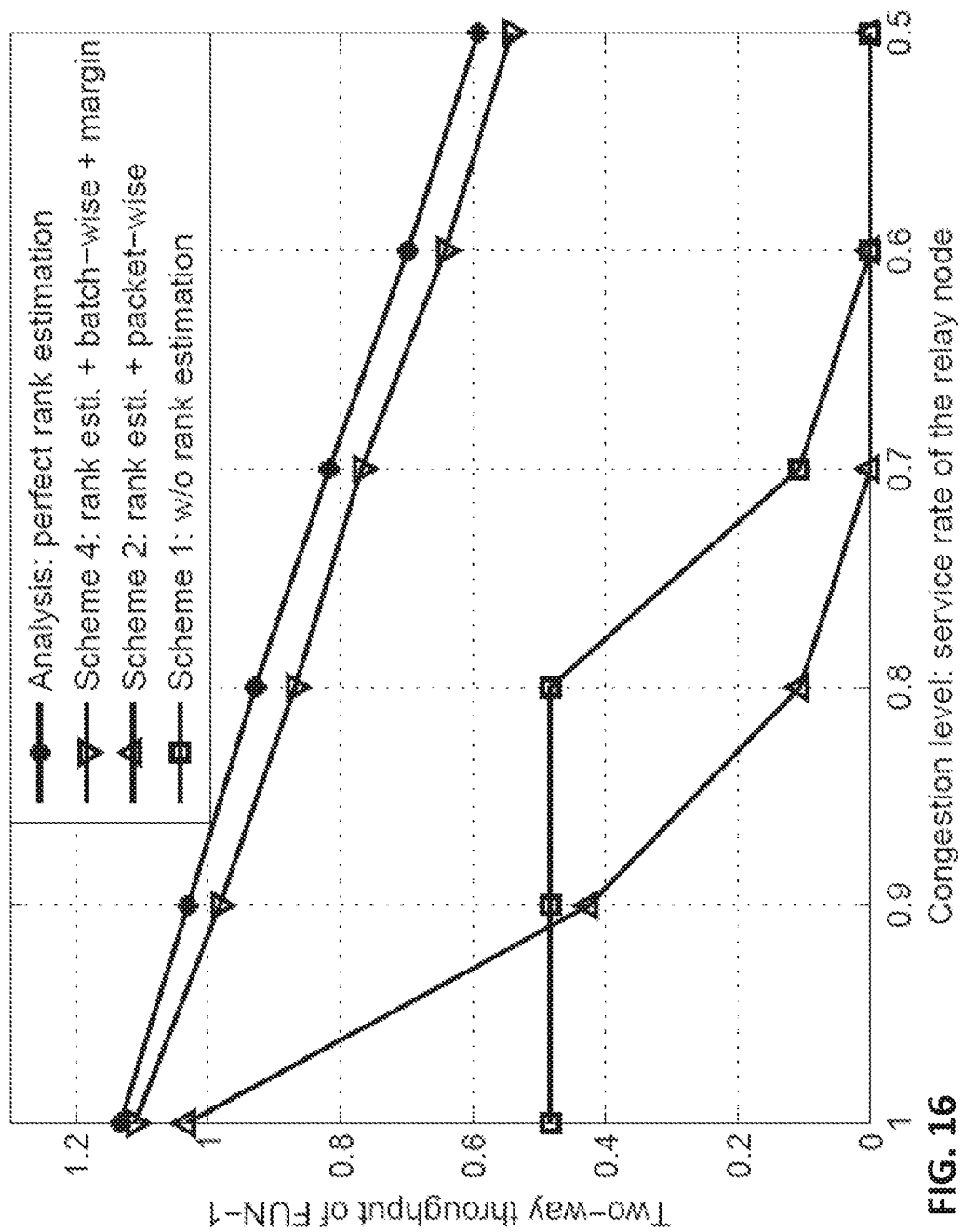
FIG. 16 is a chart showing an effect of congestion on the two-way throughput of a two-hop network according to some embodiments.

At first, the incoming and outgoing rates at the relay node are balanced as they are both 1 Mbps. As congestion level rises, the outgoing rate at the relay node drops from 1 Mbps to 0.5 Mbps, which corresponds to an increasing buffer overflow ratio from 0% to 50%. FIG. 16 shows an effect of congestion level on the two-way throughput of a two-hop network: Scheme 4 maintains a near-optimal performance as the throughput decreases linearly with the congestion level. From the throughput results in FIG. 16, we have the following observation:

Scheme 4 is the most robust against all congestion levels: its throughput drops linearly and is close to the analytical upper bound. This is because, with batch-wise buffer insertion, the structure of the received batches is well preserved. Therefore the perceived rank distribution is close to the initial estimation. For Scheme 1 and Scheme 2, however, the throughput may even drop to zero, which implies they may be infeasible in highly congested networks.

Effect of Number of Hops

Figure 17:
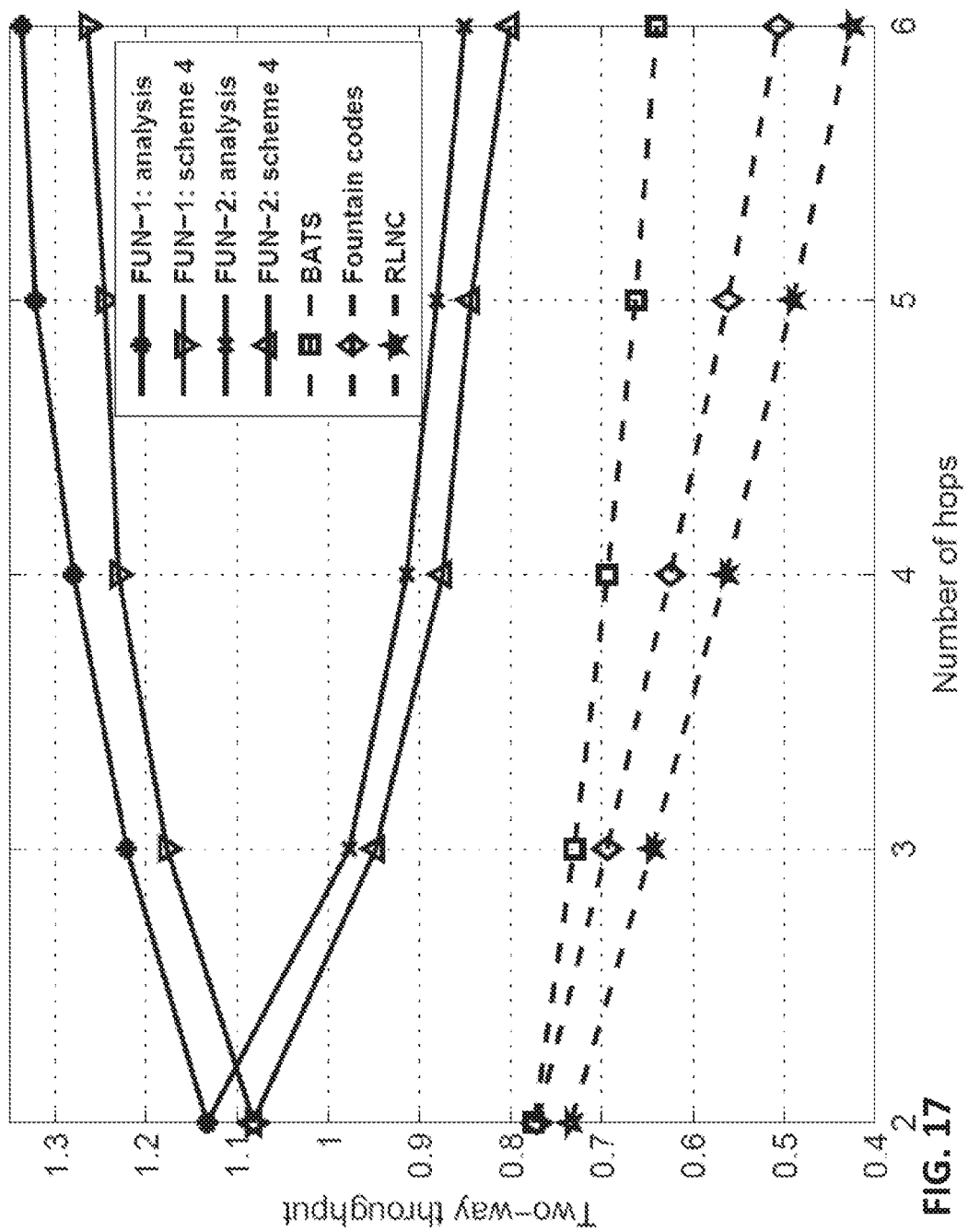
FIG. 17 is a chart showing an effect of a number of hops on the two-way throughput of a network according to some embodiments.

In this set of experiments, we examine the effect on throughput by increasing the number of hops from two to six. FIG. 17 shows an effect of number of hops on the two-way throughput: the analytical and experimental throughputs of FUN-1 and FUN-2 mainly agree; the gain of FUN-1 over FUN-2 may increase with the number of hops. As shown in FIG. 17, the throughput results of FUN-1 and FUN2 are compared with BATS, fountain codes, and RLNC. We have the following observations:

Compared with other schemes, the gain of FUN codes is significant. For FUN-1, the gain grows with the number of hops. For FUN-2, there is still a significant gain over the other coding schemes. Our proposed FUN coding design (Scheme 4) achieves near-optimal throughput in both cases. These results verify the effectiveness of our proposed design.

The experimental throughput result of FUN codes is only 5% lower than the analytical throughput calculated under perfect rank estimation (see Section IV, FIG. 4). This means our analysis and design have successfully bridged the gap between theory and practice.

Effect of Parameter Choosing

Now that we know "rank estimation+batch-wise buffer insertion+safety margin" (Scheme 4) may be the best FUN coding scheme, we are further interested in how to properly set the parameters, i.e., the number of pilot batches for rank estimation and the width of safety margin. In the following two sets of experiments, we investigate these two issues.

TABLE IV

NUMBER OF PILOT BATCHES

| Number of pilot batches | FUN-1 | FUN-2 |
|---|---|---|
| 30 | 1.0701 | 1.0591 |
| 50 | 1.0991 | 1.1003 |
| 100 | 1.1037 | 1.1060 |
| ∞ (analysis) | 1.1327 | |

1) Number of pilot batches: The inventors have recognized and appreciated that the more pilot batches we use, the more rank statistics we have and thus the higher throughput. In this set of experiments, we first use different number of pilot batches to estimate the end-to-end rank distribution, and then record the resulting throughputs in Table IV. We have the following observation:

For both FUN-1 and FUN-2, the throughput growth is 2.5% by increasing the number of pilot batches from 30 to 50, and only 1.3% as we further increase the number of pilot batches to 100. Therefore, the gain from increasing the number of pilot batches is diminishing. Empirically speaking, 30~50 pilot batches may be sufficient for batch size M=16.

Figure 18:
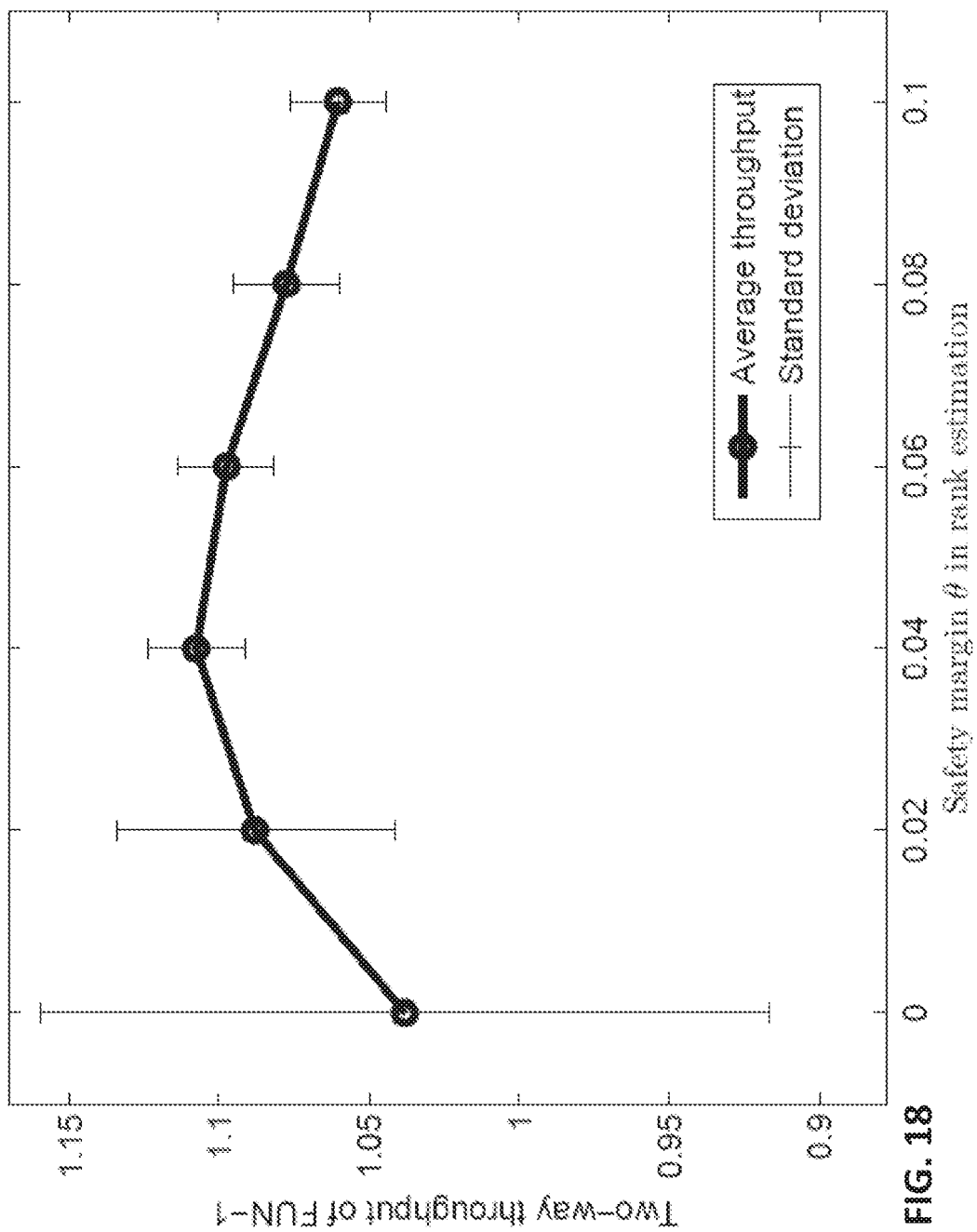
FIG. 18 is a chart showing an effect of a safety margin on the two-way throughput of a network according to some embodiments.

2) Safety margin: Similar to the number of pilot batches, the safety margin $\theta$ is another degree of freedom in the design of FUN codes. FIG. 18 shows an effect of safety margin $\theta$ on throughput: a moderate $\theta$ (4% for a two-hop network) yields the highest throughput, while a too-narrow or too-wide margin is not optimal. As shown in FIG. 18, for a two-hop network, we gradually increase $\theta$ from 0 to 0.1 to see the (i) average throughput and (ii) its standard deviation. We have the following observations:

There may exist an optimal safety margin at around θ=0.04, where the average throughput may reach the highest value of 1.1127 Mbps. The throughput gains over θ=0 and θ=0.1 are 7% and 5%, respectively.

The inventors have recognized a large variance among the throughputs obtained under a narrow safety margin. This may be explained through FIG. 9: when the estimated rank is lower than the actual rank, the throughput degradation may be stronger. Therefore, using a narrow safety margin may risk falling into the "optimistic" zone (the left part in FIG. 9), in which sharp throughput fluctuation is expected. However, with a wider safety margin applied, the rank estimation may fall into the "pessimistic" zone (the right part in FIG. 9) with higher probability, in which the throughput degradation is less significant.

REFERENCES

The following references are incorporated herein by reference in their entireties:

[1] Q. Huang, K. Sun, X. Li, and D. O. Wu, "Just FUN: A joint fountain coding and network coding approach to loss-tolerant information spreading," in ACM International Symposium on Mobile Ad Hoc Networking and Computing (MobiHoc), 2014, pp. 83-92.

[2] D. J. MacKay, "Fountain codes," IEE Proceedings-Communications, vol. 152, no. 6, pp. 1062-1068, 2005.

[3] R. Ahlswede, N. Cai, S.-Y. Li, and R. W. Yeung, "Network information flow," IEEE Transactions on Information Theory, vol. 46, no. 4, pp. 1204-1216, 2000.

[4] S.-Y. Li, R. W. Yeung, and N. Cai, "Linear network coding," IEEE Transactions on Information Theory, vol. 49, no. 2, pp. 371-381, 2003.

[5] R. Koetter and M. Médard, "An algebraic approach to network coding," IEEE/ACM Transactions on Networking, vol. 11, no. 5, pp. 782-795, 2003.

[6] T. Ho, R. Koetter, M. Médard, D. R. Karger, and M. Effros, "The benefits of coding over routing in a randomized setting," in IEEE International Symposium on Information Theory, 2003, p. 442.

[7] A. Shokrollahi, "Raptor codes," IEEE Transactions on Information Theory, vol. 52, no. 6, pp. 2551-2567, 2006.

[8] S. Yang and R. Yeung, "Batched sparse codes," IEEE Transactions on Information Theory, vol. 60, no. 9, pp. 5322-5346, September 2014.

[9] S. Yang, R. W. Yeung, H. F. Cheung, and H. H. Yin, "BATS: network coding in action," in Allerton Conference on Communication, Control, and Computing, Invited Paper, October 2014.

[10] M. Wang and B. Li, "Lava: A reality check of network coding in peer-to-peer live streaming," in IEEE International Conference on Computer Communications (INFOCOM), May 2007, pp. 1082-1090.

[11] P. A. Chou, Y. Wu, and K. Jain, "Practical network coding," in Allerton Conference on Communication, Control, and Computing, vol. 41, no. 1, 2003, pp. 40-49.

[12] Y. Li, E. Soljanin, and P. Spasojevic, "Effects of the generation size and overlap on throughput and complexity in randomized linear network coding," IEEE Transactions on Information Theory, vol. 57, no. 2, pp. 1111-1123, 2011.

[13] J.-S. Park, M. Gerla, D. S. Lun, Y. Yi, and M. Médard, "Codecast: a network-coding-based ad hoc multicast protocol," IEEE Wireless Communications, vol. 13, no. 5, pp. 76-81, 2006.

[14] S. Chachulski, M. Jennings, S. Katti, and D. Katabi, "Trading structure for randomness in wireless opportunistic routing," in ACM SIGCOMM, vol. 37, no. 4, 2007, pp. 169-180.

[15] A. Heidarzadeh and A. H. Banihashemi, "Overlapped chunked network coding," in IEEE Information Theory Workshop, 2010, pp. 1-5.

[16] B. Tang, S. Yang, Y. Yin, B. Ye, and S. Lu, "Expander graph based overlapped chunked codes," in IEEE International Symposium on Information Theory, 2012, pp. 2451-2455.

[17] S. Yang and B. Tang, "From ldpc to chunked network codes," in IEEE Information Theory Workshop, 2014, pp. 406-410.

[18] S. Katti, H. Rahul, W. Hu, D. Katabi, M. Médard, and J. Crowcroft, "XORs in the air: practical wireless network coding," in ACM SIGCOMM, 2006, pp. 243-254.

[19] D. Silva, W. Zeng, and F. R. Kschischang, "Sparse network coding with overlapping classes," in IEEE International Symposium on Network Coding, 2009, pp. 74-79.

[20] S. Feizi, D. E. Lucani, and M. Médard, "Tunable sparse network coding," in International Zurich Seminar on Communications, 2012, pp. 107-110.

[21] S. Feizi, D. E. Lucani, C. W. Sorensen, A. Makhdoumi, and M. Médard, "Tunable sparse network coding for multicast networks," in IEEE International Symposium on Network Coding, 2014, pp. 1-6.

[22] P. Maymounkov, N. J. Harvey, and D. S. Lun, "Methods for efficient network coding," in Allerton Conference on Communication, Control, and Computing, 2006, pp. 482-491.

[23] D. S. Lun, M. Médard, R. Koetter, and M. Effros, "On coding for reliable communication over packet networks," Physical Communication, vol. 1, no. 1, pp. 3-20, 2008.

[24] K. Mahdaviani, M. Ardakani, H. Bagheri, and C. Tellambura, "Gamma codes: a low-overhead linear-complexity network coding solution," in IEEE International Symposium on Network Coding, 2012.

[25] A. Shokrollahi and M. Luby, "Raptor codes," Foundations and Trends® in Communications and Information Theory, vol. 6, no. 3-4, pp. 213-322, May 2011.

[26] Rappaport, Theodore S. Wireless communications: principles and practice. Prentice-Hall: Upper Saddle River, N J, 1996.

Computing Environment

Techniques for increasing data throughput and decreasing transmission delay from a source node to a sink node via a relay node may be implemented on any suitable hardware, including a programmed computing system. For example, FIG. 1 illustrates a system implemented with multiple computing devices, which may be distributed and/or centralized. Also, FIGS. 5A, 5B, and 6 illustrate algorithms executing on at least one computing device. FIG. 5 illustrates an example of a suitable computing system environment 300 on which embodiments of these algorithms may be implemented. This computing system may be representative of a computing system that implements the described technique of increasing data throughput and decreasing transmission delay from a source node to a sink node via a relay node. However, it should be appreciated that the computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments or cloud-based computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the invention includes a general purpose computing device in the form of a computer 310. Though a programmed general purpose computer is illustrated, it should be understood by one of skill in the art that algorithms may be implemented in any suitable computing device. Accordingly, techniques as described herein may be implemented in a system for increasing data throughput and decreasing transmission delay from a source node to a sink node via a relay node. These techniques may be implemented in such network devices as originally manufactured or as a retrofit, such as by changing program memory devices holding programming for such network devices or software download. Thus, some or all of the components illustrated in FIG. 19, though illustrated as part of a general purpose computer, may be regarded as representing portions of a node or other component in a network system.

Components of computer 310 may include, but are not limited to, a processing unit 320, a system memory 330, and a system bus 321 that couples various system components including the system memory 330 to the processing unit 320. The system bus 321 may be any of several types of bus structures including a memory bus or memory controller, a peripheral bus, and a local bus using any of a variety of bus architectures. By way of example and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 310. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example and not limitation, communication media includes wired media such as a wired network or direct-wired connection, and wireless media such as acoustic, radio frequency (RF), infrared (IR), and other wireless media. Combinations of any of the above should also be included within the scope of computer readable media.

Figure 19:
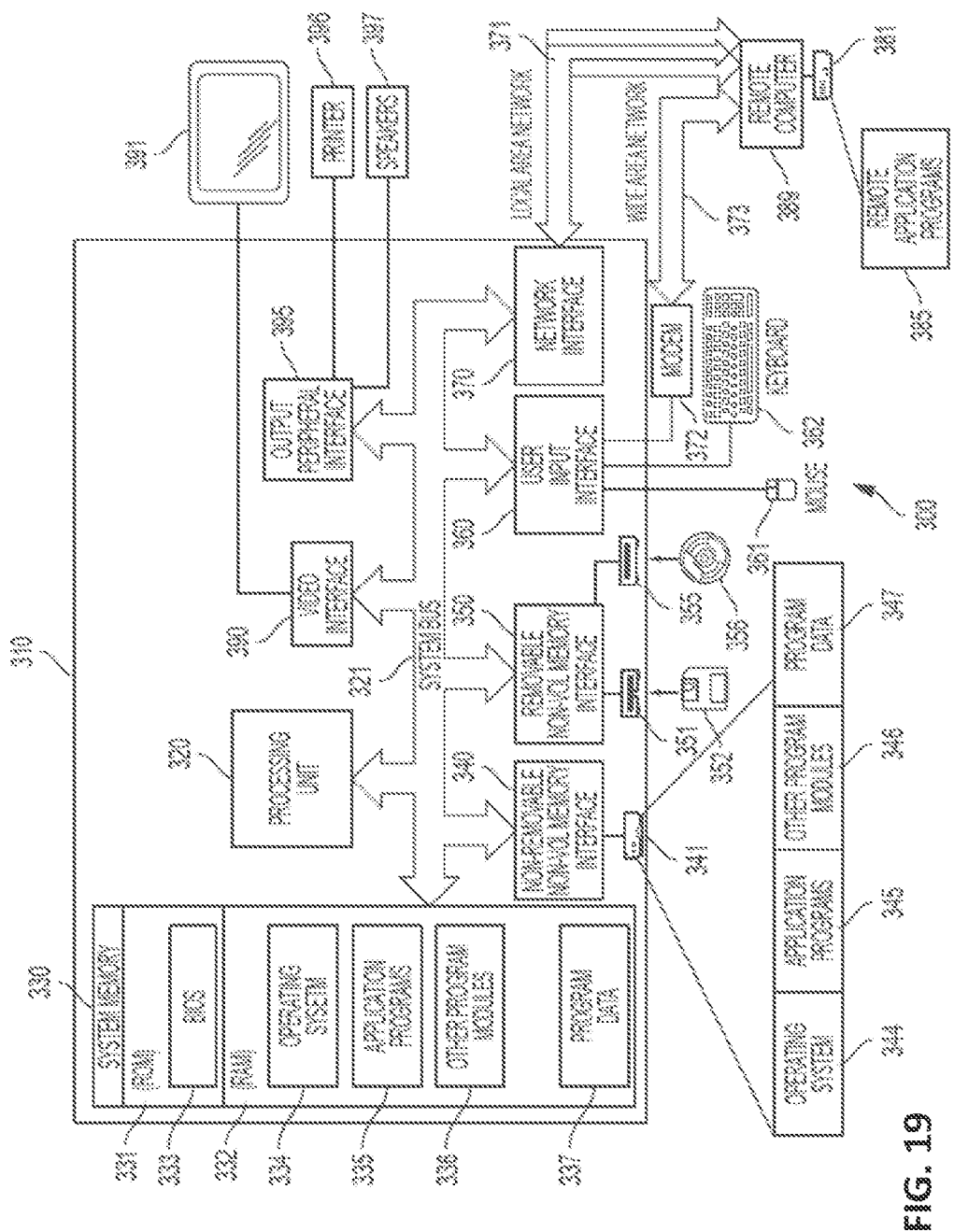
FIG. 19 is a diagram illustrating a computer system on which some embodiments of the invention may be implemented.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example and not limitation, FIG. 19 illustrates operating system 334, application programs 335, other program modules 336, and program data 337.

The computer 310 may also include other removable/non-removable, volatile/nonvolatile computer storage media. By way of example only, FIG. 19 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through an non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 19, provide storage of computer readable instructions, data structures, program modules, and other data for the computer 310. In FIG. 19, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a keyboard 362 and pointing device 361, commonly referred to as a mouse, trackball, or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port, or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device, or some other common network node, and typically includes many or all of the elements described above relative to the computer 310, although only a memory storage device 381 has been illustrated in FIG. 19. The logical connections depicted in FIG. 19 include a local area network (LAN) 371 and a wide area network (WAN) 373, but may also include other networks. Such networking environments are commonplace in offices, enterprise-wide computer networks, intranets, and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example and not limitation, FIG. 19 illustrates remote application programs 385 as residing on memory device 381. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the attached claims, various elements are recited in different claims. However, the claimed elements, even if recited in separate claims, may be used together in any suitable combination.

The invention claimed is:

1. A network system for increasing data throughput and decreasing transmission delay along a data link from a source node to a sink node via at least one relay node, the network system comprising:

at least one second node configured to:
receive a first plurality of data packets from a first node,
estimate a rank distribution associated with the first plurality of data packets, wherein the estimated rank distribution comprises probabilities of ranks of the first plurality of data packets and expresses a quality of the data link,
decrease average values of the estimated rank distribution by a safety margin, and
then transmit the estimated rank distribution to the first node; and
the first node being configured to encode a second plurality of data packets using rateless coding based at least in part on the estimated rank distribution, and transmit the encoded second plurality of data packets, wherein
the first node comprises the source node, and
the at least one second node comprises at least one of the sink node or the at least one relay node.

2. The network system of claim 1, wherein:
the at least one second node comprises the sink node configured to:
receive one or more of the encoded second plurality of data packets from the source node via the at least one relay node, and
if the sink node has received a sufficient quantity of the encoded second plurality of data packets, regenerate and decode the second plurality of data packets.

3. The network system of claim 2, wherein:
the source node is further configured to, prior to transmitting the encoded second plurality of data packets, transmit the first plurality of data packets, and
the at least one relay node is configured to, prior to receiving at least one of the encoded second plurality of data packets from the first node, receive at least one of the first plurality of data packets from the source node and relay the at least one of the first plurality of data packets, the first plurality of data packets comprising a plurality of full-rank batches.

4. The network system of claim 3, wherein the plurality of full-rank batches comprises between about 20 and 60 full-rank batches.

5. The network system of claim 2, wherein:
the at least one relay node is further configured to relay the estimated rank distribution, and
the source node is further configured to:
receive the estimated rank distribution from the at least one relay node; and
acknowledge the estimated rank distribution.

6. The network system of claim 1, wherein:
the at least one second node comprises the at least one relay node configured to:
receive at least one of the encoded second plurality of data packets from the source node, and
if the at least one relay node has received a sufficient quantity of the encoded second plurality of data packets, regenerate, re-encode, and relay the second plurality of data packets to an additional relay node or a sink node.

7. The network system of claim 1, wherein the safety margin is between 1 percent of the estimated rank distribution and 7 percent of the estimated rank distribution.

8. At least one computer-readable and non-transitory storage medium encoded with executable instructions that, when executed by at least one processor, cause the at least one processor to perform a method for increasing data throughput and decreasing transmission delay along a data link from a source node to a sink node via at least one relay node, the method comprising:

receiving, from the at least one relay node, a first plurality of data packets;
estimating a rank distribution associated with the first plurality of data packets, wherein the estimated rank distribution comprises probabilities of ranks of the first plurality of data packets and expresses a quality of the data link;
decreasing the estimated rank distribution by a safety margin;
and then transmitting the estimated rank distribution to the source node;
receiving a second plurality of data packets, wherein the second plurality of data packets are encoded by the source code based at least in part on the estimated rank distribution; and
if a sufficient quantity of the second plurality of data packets are received, regenerating and decoding the second plurality of data packets.

9. The at least one computer-readable and non-transitory storage medium of claim 8, wherein the safety margin is between about 1 percent of the estimated rank distribution and about 7 percent of the estimated rank distribution.

10. The at least one computer-readable and non-transitory storage medium of claim 9, wherein the first plurality of data packets comprises a plurality of full-rank batches.

11. The at least one computer-readable and non-transitory storage medium of claim 10, wherein the first plurality of full-rank batches comprises between about 20 and 60 full-rank batches.

12. The at least one computer-readable and non-transitory storage medium of claim 8, the method further comprising receiving, from the source node, an acknowledgement of the estimated rank distribution.

13. A network system for increasing data throughput and decreasing transmission delay along a data link from a source node to a sink node via at least one relay node, the network system comprising:
the source node configured to encode a plurality of data packets using rateless coding and transmit the encoded plurality of data packets, wherein (1) the encoding is based at least in part on an estimated rank distribution, (2) the estimated rank distribution is estimated by the sink node or the at least one relay node, (3) the estimated rank distribution comprises probabilities of ranks of a plurality of pilot data packets received from the source node and expresses a quality of the data link; and
the at least one relay node configured to:
estimate the estimated rank distribution based on the plurality of pilot data packets, decrease average values of the estimated rank distribution by a safety margin, and then transmit the estimated rank distribution to the source node,
receive at least one of the encoded plurality of data packets from the source node,
if the at least one relay node has received a sufficient quantity of the encoded plurality of data packets:
regenerate and re-encode the plurality of data packets,
buffer the plurality of data packets until a transmit buffer can accommodate enough data packets to fill an entire batch with data packets, and
relay the entire batch of data packets based on the transmit buffer holding enough data packets to fill the entire batch.

14. The network system of claim 13, wherein:
the at least one relay node is further configured to, until the transmit buffer can accommodate enough data packets to fill the entire batch with data packets, discard additional batches received.

15. The network system of claim 13, wherein the safety margin is between 1 percent of the estimated rank distribution and 7 percent of the estimated rank distribution.

16. The network system of claim 13, wherein:
the network system further comprises a sink node configured to:
receive one or more of the plurality of data packets from the at least one relay node, and
if the sink node has received the sufficient quantity of the plurality of data packets, regenerate and decode the plurality of data packets,
the source node is further configured to, prior to transmitting the plurality of data packets, transmit a plurality of full-rank batches,
the at least one relay node is further configured to, prior to receiving the at least one of the plurality of data packets from the source node, receive at least one of the plurality of full-rank batches from the source node and relay the at least one of the plurality of full-rank batches, and
the sink node is further configured to, prior to receiving the one or more of the plurality of data packets from the at least one relay node:
receive one or more of the plurality of full-rank batches from the at least one relay node,
estimate the rank distribution based on the one or more of the plurality of full-rank batches, and
transmit the estimated rank distribution to the source node.

* * * * *